(12) United States Patent
Judge et al.

(10) Patent No.: US 8,549,611 B2
(45) Date of Patent: Oct. 1, 2013

(54) SYSTEMS AND METHODS FOR CLASSIFICATION OF MESSAGING ENTITIES

(75) Inventors: Paul Judge, Atlanta, GA (US); Dmitri Alperovitch, Atlanta, GA (US); Matt Moyer, Atlanta, GA (US); Sven Krasser, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/185,653

(22) Filed: Jul. 19, 2011
(Under 37 CFR 1.47)

(65) Prior Publication Data

US 2012/0271890 A1   Oct. 25, 2012

Related U.S. Application Data

(63) Continuation of application No. 11/142,943, filed on Jun. 2, 2005, now abandoned, and a continuation-in-part of application No. 10/384,924, filed on Mar. 6, 2003, now Pat. No. 7,694,128, and a continuation-in-part of application No. 10/373,325, filed on Feb. 24, 2003, now Pat. No. 7,213,260, and a continuation-in-part of application No. 10/361,091, filed on Feb. 7, 2003, now Pat. No. 7,096,498, and a continuation-in-part of application No. 10/361,067, filed on Feb. 7, 2003, now abandoned, and a continuation-in-part of application No. 10/094,266, filed on Mar. 8, 2002, now Pat. No. 7,124,438, and a continuation-in-part of application No. 10/094,211, filed on Mar. 8, 2002, now Pat. No. 7,458,098, and a continuation-in-part of application No. 10/093,553, filed on Mar. 8, 2002, now Pat. No. 6,941,467.

(60) Provisional application No. 60/625,507, filed on Nov. 5, 2004.

(51) Int. Cl.
*G06F 15/16* (2006.01)
*G06F 12/14* (2006.01)

(52) U.S. Cl.
USPC .................. 726/13; 726/22; 726/23; 726/24

(58) Field of Classification Search
None
See application file for complete search history.

(56) References Cited

U.S. PATENT DOCUMENTS 4,289,930 A   9/1981   Connolly et al.
4,384,325 A   5/1983   Slechta et al.

(Continued)

FOREIGN PATENT DOCUMENTS

AU   2003230606   10/2003
AU   2005304883   5/2006

(Continued)

OTHER PUBLICATIONS

Extended European Search Report, PCT Application No. PCT/US2006/060771, dated Mar. 12, 2010, 7 pages.

(Continued)

*Primary Examiner* — Kaveh Abrishamkar
(74) *Attorney, Agent, or Firm* — Patent Capital Group

(57) ABSTRACT

Methods and systems for operation upon one or more data processors for assigning a reputation to a messaging entity. A method can include receiving data that identifies one or more characteristics related to a messaging entity's communication. A reputation score is determined based upon the received identification data. The determined reputation score is indicative of reputation of the messaging entity. The determined reputation score is used in deciding what action is to be taken with respect to a communication associated with the messaging entity.

21 Claims, 8 Drawing Sheets

(56) References Cited

U.S. PATENT DOCUMENTS

| | | |
|---|---|---|
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,136,690 A | 8/1992 | Becker et al. |
| 5,144,557 A | 9/1992 | Wang et al. |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,384,848 A | 1/1995 | Kikuchi |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,586,254 A | 12/1996 | Kondo et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,768,552 A | 6/1998 | Jacoby |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,830 A | 4/1999 | Wesinger et al. |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,987,610 A | 11/1999 | Franczek et al. |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,052,784 A | 4/2000 | Day |
| 6,058,381 A | 5/2000 | Nelson |

| Patent No. | Date | Inventor |
|---|---|---|
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,073,142 A | 6/2000 | Geiger et al. |
| 6,088,804 A | 7/2000 | Hill et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A | 9/2000 | Baumgart et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A * | 12/2000 | Horvitz et al. ............... 709/206 |
| 6,165,314 A | 12/2000 | Gardner et al. |
| 6,185,314 B1 | 2/2001 | Crabtree et al. |
| 6,185,680 B1 | 2/2001 | Shimbo et al. |
| 6,185,689 B1 | 2/2001 | Todd et al. |
| 6,192,360 B1 | 2/2001 | Dumais et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,247,045 B1 | 6/2001 | Shaw et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 | 7/2001 | Vanderveldt et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,434,624 B1 | 8/2002 | Gai et al. |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,050 B1 | 10/2002 | Pace et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson et al. |
| 6,636,946 B2 | 10/2003 | Jeddeloh |
| 6,650,890 B1 | 11/2003 | Irlam et al. |
| 6,654,787 B1 | 11/2003 | Aronson et al. |
| 6,661,353 B1 | 12/2003 | Gopen |
| 6,662,170 B1 | 12/2003 | Dom et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,711,687 B1 | 3/2004 | Sekiguchi |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,116 B1 | 5/2004 | Matsui et al. |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,760,309 B1 | 7/2004 | Rochberger et al. |
| 6,768,991 B2 | 7/2004 | Hearnden |
| 6,769,016 B2 | 7/2004 | Rothwell et al. |
| 6,772,196 B1 | 8/2004 | Kirsch et al. |
| 6,775,657 B1 | 8/2004 | Baker |
| 6,792,546 B1 | 9/2004 | Shanklin et al. |
| 6,880,156 B1 | 4/2005 | Landherr et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,895,438 B1 | 5/2005 | Ulrich |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 6,981,158 B1 | 12/2005 | Mullen et al. |
| 7,051,077 B2 * | 5/2006 | Lin ............................. 709/207 |
| 7,076,527 B2 | 7/2006 | Bellegarda et al. |
| 7,089,428 B2 | 8/2006 | Farley et al. |
| 7,089,590 B2 | 8/2006 | Judge et al. |
| 7,092,992 B1 | 8/2006 | Yu |
| 7,093,129 B1 | 8/2006 | Gavagni et al. |
| 7,096,498 B2 | 8/2006 | Judge |
| 7,117,358 B2 * | 10/2006 | Bandini et al. ............... 713/153 |
| 7,124,372 B2 | 10/2006 | Brin |
| 7,124,438 B2 | 10/2006 | Judge et al. |
| 7,131,003 B2 | 10/2006 | Lord et al. |
| 7,143,213 B2 | 11/2006 | Need et al. |
| 7,152,105 B2 | 12/2006 | McClure et al. |
| 7,155,243 B2 | 12/2006 | Baldwin et al. |
| 7,164,678 B2 | 1/2007 | Connor |
| 7,206,814 B2 | 4/2007 | Kirsch |
| 7,209,954 B1 | 4/2007 | Rothwell et al. |
| 7,213,260 B2 | 5/2007 | Judge |
| 7,219,131 B2 | 5/2007 | Banister et al. |
| 7,225,466 B2 | 5/2007 | Judge |
| 7,254,608 B2 | 8/2007 | Yeager et al. |
| 7,254,712 B2 | 8/2007 | Godfrey et al. |
| 7,260,840 B2 | 8/2007 | Swander et al. |
| 7,272,149 B2 | 9/2007 | Bly et al. |
| 7,272,853 B2 * | 9/2007 | Goodman et al. ............... 726/13 |
| 7,278,159 B2 | 10/2007 | Kaashoek et al. |

| | | | | | |
|---|---|---|---|---|---|
| 7,349,332 B1 | 3/2008 | Srinivasan et al. | 2002/0133365 A1 | 9/2002 | Grey et al. |
| 7,376,731 B2 | 5/2008 | Khan et al. | 2002/0138416 A1 | 9/2002 | Lovejoy et al. |
| 7,379,900 B1 | 5/2008 | Wren | 2002/0138755 A1 | 9/2002 | Ko |
| 7,385,924 B1 | 6/2008 | Riddle | 2002/0138759 A1 | 9/2002 | Dutta |
| 7,458,098 B2 | 11/2008 | Judge et al. | 2002/0138762 A1 | 9/2002 | Horne |
| 7,460,476 B1 | 12/2008 | Morris et al. | 2002/0143963 A1 | 10/2002 | Converse et al. |
| 7,461,339 B2 | 12/2008 | Liao et al. | 2002/0147734 A1 | 10/2002 | Shoup et al. |
| 7,496,634 B1 | 2/2009 | Cooley | 2002/0152399 A1 | 10/2002 | Smith |
| 7,502,829 B2 | 3/2009 | Radatti et al. | 2002/0165971 A1 | 11/2002 | Baron |
| 7,506,155 B1 | 3/2009 | Stewart et al. | 2002/0169954 A1 | 11/2002 | Bandini et al. |
| 7,519,563 B1 | 4/2009 | Urmanov et al. | 2002/0172367 A1 | 11/2002 | Mulder et al. |
| 7,519,994 B2 | 4/2009 | Judge et al. | 2002/0178227 A1 | 11/2002 | Matsa et al. |
| 7,522,516 B1 | 4/2009 | Parker | 2002/0178383 A1 | 11/2002 | Hrabik et al. |
| 7,523,092 B2 | 4/2009 | Andreev et al. | 2002/0178410 A1 | 11/2002 | Haitsma et al. |
| 7,543,053 B2 | 6/2009 | Goodman et al. | 2002/0188732 A1 | 12/2002 | Buckman et al. |
| 7,543,056 B2 | 6/2009 | McClure et al. | 2002/0188864 A1 | 12/2002 | Jackson |
| 7,545,748 B1 | 6/2009 | Riddle | 2002/0194469 A1 | 12/2002 | Dominique et al. |
| 7,610,344 B2 | 10/2009 | Mehr et al. | 2002/0199095 A1 | 12/2002 | Bandini et al. |
| 7,617,160 B1 | 11/2009 | Grove et al. | 2003/0005326 A1 | 1/2003 | Flemming |
| 7,620,986 B1 | 11/2009 | Jagannathan et al. | 2003/0005331 A1 | 1/2003 | Williams |
| 7,624,448 B2 | 11/2009 | Coffman | 2003/0009554 A1 | 1/2003 | Burch et al. |
| 7,644,127 B2 | 1/2010 | Yu | 2003/0009693 A1 | 1/2003 | Brock et al. |
| 7,647,411 B1 | 1/2010 | Schiavone et al. | 2003/0009696 A1 | 1/2003 | Bunker et al. |
| 7,668,951 B2 | 2/2010 | Lund et al. | 2003/0009699 A1 | 1/2003 | Gupta et al. |
| 7,693,947 B2 | 4/2010 | Judge et al. | 2003/0014664 A1 | 1/2003 | Hentunen |
| 7,694,128 B2 | 4/2010 | Judge et al. | 2003/0023692 A1 | 1/2003 | Moroo |
| 7,711,684 B2 | 5/2010 | Sundaresan et al. | 2003/0023695 A1 | 1/2003 | Kobata et al. |
| 7,716,310 B2 | 5/2010 | Foti | 2003/0023736 A1 | 1/2003 | Abkemeier |
| 7,730,316 B1 | 6/2010 | Baccash | 2003/0023873 A1 | 1/2003 | Ben |
| 7,739,253 B1 | 6/2010 | Yanovsky et al. | 2003/0023874 A1 | 1/2003 | Prokupets et al. |
| 7,748,038 B2 | 6/2010 | Olivier et al. | 2003/0023875 A1 | 1/2003 | Hursey et al. |
| 7,779,156 B2 | 8/2010 | Alperovitch et al. | 2003/0028803 A1 | 2/2003 | Bunker et al. |
| 7,779,466 B2 | 8/2010 | Judge et al. | 2003/0033516 A1 | 2/2003 | Howard et al. |
| 7,870,203 B2 | 1/2011 | Judge et al. | 2003/0033542 A1 | 2/2003 | Goseva et al. |
| 7,899,866 B1 | 3/2011 | Buckingham et al. | 2003/0041264 A1 | 2/2003 | Black et al. |
| 7,903,549 B2 | 3/2011 | Judge et al. | 2003/0046253 A1 | 3/2003 | Shetty et al. |
| 7,917,627 B1 | 3/2011 | Andriantsiferana et al. | 2003/0051026 A1 | 3/2003 | Carter et al. |
| 7,937,480 B2 | 5/2011 | Alperovitch et al. | 2003/0051163 A1 | 3/2003 | Bidaud |
| 7,941,523 B2 | 5/2011 | Andreev et al. | 2003/0051168 A1 | 3/2003 | King et al. |
| 7,949,716 B2 | 5/2011 | Alperovitch et al. | 2003/0055931 A1 | 3/2003 | Cravo et al. |
| 7,949,992 B2 | 5/2011 | Andreev et al. | 2003/0061506 A1 | 3/2003 | Cooper et al. |
| 7,966,335 B2 | 6/2011 | Sundaresan et al. | 2003/0065943 A1 | 4/2003 | Geis et al. |
| 8,042,149 B2 | 10/2011 | Judge | 2003/0084280 A1 | 5/2003 | Bryan et al. |
| 8,042,181 B2 | 10/2011 | Judge | 2003/0084320 A1 | 5/2003 | Tarquini et al. |
| 8,045,458 B2 | 10/2011 | Alperovitch et al. | 2003/0084323 A1 | 5/2003 | Gales |
| 8,051,134 B1 | 11/2011 | Begeja et al. | 2003/0084347 A1 | 5/2003 | Luzzatto |
| 8,069,481 B2 | 11/2011 | Judge | 2003/0088792 A1 | 5/2003 | Card et al. |
| 8,079,087 B1 | 12/2011 | Spies et al. | 2003/0093518 A1 | 5/2003 | Hiraga |
| 8,095,876 B1 | 1/2012 | Verstak et al. | 2003/0093667 A1 | 5/2003 | Dutta et al. |
| 8,132,250 B2 | 3/2012 | Judge et al. | 2003/0093695 A1 | 5/2003 | Dutta |
| 8,160,975 B2 | 4/2012 | Tang et al. | 2003/0093696 A1 | 5/2003 | Sugimoto |
| 8,179,798 B2 | 5/2012 | Alperovitch et al. | 2003/0095555 A1 | 5/2003 | McNamara et al. |
| 8,185,930 B2 | 5/2012 | Alperovitch et al. | 2003/0097439 A1 | 5/2003 | Strayer et al. |
| 8,214,497 B2 | 7/2012 | Alperovitch et al. | 2003/0097564 A1 | 5/2003 | Tewari et al. |
| 2001/0037311 A1 | 11/2001 | McCoy et al. | 2003/0105976 A1 | 6/2003 | Copeland |
| 2001/0049793 A1 | 12/2001 | Sugimoto | 2003/0110392 A1 | 6/2003 | Aucsmith et al. |
| 2002/0004902 A1 | 1/2002 | Toh et al. | 2003/0110396 A1 | 6/2003 | Lewis et al. |
| 2002/0009079 A1 | 1/2002 | Jugck et al. | 2003/0115485 A1 | 6/2003 | Milliken |
| 2002/0013692 A1 | 1/2002 | Chandhok et al. | 2003/0115486 A1 | 6/2003 | Choi et al. |
| 2002/0016824 A1 | 2/2002 | Leeds | 2003/0123665 A1 | 7/2003 | Dunstan et al. |
| 2002/0016910 A1 | 2/2002 | Wright et al. | 2003/0126464 A1 | 7/2003 | McDaniel et al. |
| 2002/0023089 A1 | 2/2002 | Woo | 2003/0126472 A1 | 7/2003 | Banzhof |
| 2002/0023140 A1 | 2/2002 | Hile et al. | 2003/0135749 A1 | 7/2003 | Gales et al. |
| 2002/0026591 A1 | 2/2002 | Hartley et al. | 2003/0140137 A1 | 7/2003 | Joiner et al. |
| 2002/0032871 A1 | 3/2002 | Malan et al. | 2003/0140250 A1 | 7/2003 | Taninaka et al. |
| 2002/0035683 A1 | 3/2002 | Kaashoek et al. | 2003/0145212 A1 | 7/2003 | Crumly |
| 2002/0042876 A1 | 4/2002 | Smith | 2003/0145225 A1 | 7/2003 | Bruton et al. |
| 2002/0046041 A1 | 4/2002 | Lang | 2003/0145226 A1 | 7/2003 | Bruton et al. |
| 2002/0049853 A1 | 4/2002 | Chu et al. | 2003/0149887 A1 | 8/2003 | Yadav |
| 2002/0051575 A1 | 5/2002 | Myers et al. | 2003/0149888 A1 | 8/2003 | Yadav |
| 2002/0059454 A1 | 5/2002 | Barrett et al. | 2003/0152076 A1 | 8/2003 | Lee et al. |
| 2002/0062368 A1 | 5/2002 | Holtzman et al. | 2003/0152096 A1 | 8/2003 | Chapman |
| 2002/0078382 A1 | 6/2002 | Sheikh et al. | 2003/0154393 A1 | 8/2003 | Young |
| 2002/0087882 A1 | 7/2002 | Schneier et al. | 2003/0154399 A1 | 8/2003 | Zuk et al. |
| 2002/0095492 A1 | 7/2002 | Kaashoek et al. | 2003/0154402 A1 | 8/2003 | Pandit et al. |
| 2002/0112013 A1 | 8/2002 | Walsh | 2003/0158905 A1 | 8/2003 | Petry et al. |
| 2002/0112185 A1 | 8/2002 | Hodges | 2003/0159069 A1 | 8/2003 | Choi et al. |
| 2002/0116627 A1 | 8/2002 | Tarbotton et al. | 2003/0159070 A1 | 8/2003 | Mayer et al. |
| 2002/0120853 A1 | 8/2002 | Tyree | 2003/0167308 A1 | 9/2003 | Schran |

| | | | | | | |
|---|---|---|---|---|---|---|
| 2003/0167402 A1 | 9/2003 | Stolfo et al. | | 2006/0042483 A1 | 3/2006 | Work et al. |
| 2003/0172166 A1 | 9/2003 | Judge et al. | | 2006/0047794 A1 | 3/2006 | Jezierski |
| 2003/0172167 A1 | 9/2003 | Judge et al. | | 2006/0059238 A1 | 3/2006 | Slater et al. |
| 2003/0172289 A1 | 9/2003 | Soppera | | 2006/0095404 A1 | 5/2006 | Adelman et al. |
| 2003/0172291 A1 | 9/2003 | Judge et al. | | 2006/0095586 A1 | 5/2006 | Adelman et al. |
| 2003/0172292 A1 | 9/2003 | Judge | | 2006/0112026 A1 | 5/2006 | Graf et al. |
| 2003/0172294 A1 | 9/2003 | Judge | | 2006/0123083 A1 | 6/2006 | Goutte et al. |
| 2003/0172301 A1 | 9/2003 | Judge et al. | | 2006/0129810 A1 | 6/2006 | Jeong et al. |
| 2003/0172302 A1 | 9/2003 | Judge et al. | | 2006/0149821 A1 | 7/2006 | Rajan et al. |
| 2003/0182421 A1 | 9/2003 | Faybishenko et al. | | 2006/0155553 A1 | 7/2006 | Brohman et al. |
| 2003/0187936 A1 | 10/2003 | Bodin et al. | | 2006/0168024 A1 | 7/2006 | Mehr et al. |
| 2003/0187996 A1 | 10/2003 | Cardina et al. | | 2006/0174337 A1 | 8/2006 | Bernoth |
| 2003/0204596 A1 | 10/2003 | Yadav | | 2006/0174341 A1 | 8/2006 | Judge |
| 2003/0204719 A1 | 10/2003 | Ben | | 2006/0179113 A1 | 8/2006 | Buckingham et al. |
| 2003/0204741 A1 | 10/2003 | Schoen et al. | | 2006/0184632 A1 | 8/2006 | Marino et al. |
| 2003/0212791 A1 | 11/2003 | Pickup | | 2006/0191002 A1 | 8/2006 | Lee et al. |
| 2003/0233328 A1 | 12/2003 | Scott et al. | | 2006/0212925 A1 | 9/2006 | Shull et al. |
| 2004/0015554 A1 | 1/2004 | Wilson | | 2006/0212930 A1 | 9/2006 | Shull et al. |
| 2004/0025044 A1 | 2/2004 | Day | | 2006/0212931 A1 | 9/2006 | Shull et al. |
| 2004/0034794 A1 | 2/2004 | Mayer et al. | | 2006/0225136 A1 | 10/2006 | Rounthwaite et al. |
| 2004/0054886 A1 | 3/2004 | Dickinson et al. | | 2006/0230039 A1 | 10/2006 | Shull et al. |
| 2004/0058673 A1 | 3/2004 | Irlam et al. | | 2006/0230134 A1 | 10/2006 | Qian et al. |
| 2004/0059811 A1 | 3/2004 | Sugauchi et al. | | 2006/0248156 A1 | 11/2006 | Judge et al. |
| 2004/0088570 A1 | 5/2004 | Roberts et al. | | 2006/0251068 A1 | 11/2006 | Judge et al. |
| 2004/0098464 A1 | 5/2004 | Koch et al. | | 2006/0253447 A1 | 11/2006 | Judge |
| 2004/0111519 A1 | 6/2004 | Fu et al. | | 2006/0253458 A1 | 11/2006 | Dixon et al. |
| 2004/0111531 A1 | 6/2004 | Staniford et al. | | 2006/0253578 A1 | 11/2006 | Dixon et al. |
| 2004/0122926 A1 | 6/2004 | Moore et al. | | 2006/0253579 A1 | 11/2006 | Dixon et al. |
| 2004/0122967 A1 | 6/2004 | Bressler et al. | | 2006/0253582 A1 | 11/2006 | Dixon et al. |
| 2004/0123157 A1 | 6/2004 | Alagna et al. | | 2006/0253584 A1 | 11/2006 | Dixon et al. |
| 2004/0128355 A1 | 7/2004 | Chao et al. | | 2006/0265747 A1 | 11/2006 | Judge |
| 2004/0139160 A1 | 7/2004 | Wallace et al. | | 2006/0267802 A1 | 11/2006 | Judge et al. |
| 2004/0139334 A1 | 7/2004 | Wiseman | | 2006/0277259 A1 | 12/2006 | Murphy et al. |
| 2004/0165727 A1 | 8/2004 | Moreh et al. | | 2007/0002831 A1 | 1/2007 | Allen et al. |
| 2004/0167968 A1 | 8/2004 | Wilson et al. | | 2007/0019235 A1 | 1/2007 | Lee |
| 2004/0177120 A1* | 9/2004 | Kirsch .......................... 709/206 | | 2007/0025304 A1 | 2/2007 | Leelahakriengkrai et al. |
| 2004/0203589 A1 | 10/2004 | Wang et al. | | 2007/0027992 A1 | 2/2007 | Judge et al. |
| 2004/0205135 A1 | 10/2004 | Hallam | | 2007/0028301 A1 | 2/2007 | Shull et al. |
| 2004/0221062 A1 | 11/2004 | Starbuck et al. | | 2007/0043738 A1 | 2/2007 | Morris et al. |
| 2004/0236884 A1 | 11/2004 | Beetz | | 2007/0078675 A1 | 4/2007 | Kaplan |
| 2004/0249895 A1 | 12/2004 | Way | | 2007/0124803 A1 | 5/2007 | Taraz |
| 2004/0255122 A1 | 12/2004 | Ingerman et al. | | 2007/0130350 A1 | 6/2007 | Alperovitch et al. |
| 2004/0267893 A1 | 12/2004 | Lin | | 2007/0130351 A1 | 6/2007 | Alperovitch et al. |
| 2005/0021738 A1 | 1/2005 | Goeller et al. | | 2007/0168394 A1 | 7/2007 | Vivekanand |
| 2005/0021997 A1 | 1/2005 | Beynon et al. | | 2007/0195753 A1 | 8/2007 | Judge et al. |
| 2005/0033742 A1 | 2/2005 | Kamvar et al. | | 2007/0195779 A1 | 8/2007 | Judge et al. |
| 2005/0052998 A1 | 3/2005 | Oliver et al. | | 2007/0199070 A1 | 8/2007 | Hughes |
| 2005/0060295 A1 | 3/2005 | Gould et al. | | 2007/0203997 A1 | 8/2007 | Ingerman et al. |
| 2005/0060643 A1 | 3/2005 | Glass et al. | | 2007/0208817 A1 | 9/2007 | Lund et al. |
| 2005/0065810 A1 | 3/2005 | Bouron | | 2007/0214151 A1 | 9/2007 | Thomas et al. |
| 2005/0086300 A1 | 4/2005 | Yeager et al. | | 2007/0233787 A1 | 10/2007 | Pagan |
| 2005/0091319 A1 | 4/2005 | Kirsch | | 2007/0239642 A1 | 10/2007 | Sindhwani et al. |
| 2005/0091320 A1 | 4/2005 | Kirsch et al. | | 2007/0253412 A1 | 11/2007 | Batteram et al. |
| 2005/0102366 A1 | 5/2005 | Kirsch | | 2008/0005223 A1 | 1/2008 | Flake et al. |
| 2005/0120019 A1 | 6/2005 | Rigoutsos et al. | | 2008/0022384 A1 | 1/2008 | Yee et al. |
| 2005/0141427 A1 | 6/2005 | Bartky | | 2008/0047009 A1 | 2/2008 | Overcash et al. |
| 2005/0149383 A1 | 7/2005 | Zacharia et al. | | 2008/0077517 A1 | 3/2008 | Sappington |
| 2005/0159998 A1 | 7/2005 | Buyukkokten et al. | | 2008/0082662 A1 | 4/2008 | Dandliker et al. |
| 2005/0160148 A1 | 7/2005 | Yu | | 2008/0091765 A1 | 4/2008 | Gammage et al. |
| 2005/0192958 A1 | 9/2005 | Widjojo et al. | | 2008/0103843 A1 | 5/2008 | Goeppert et al. |
| 2005/0193076 A1 | 9/2005 | Flury et al. | | 2008/0104180 A1 | 5/2008 | Gabe |
| 2005/0198159 A1 | 9/2005 | Kirsch | | 2008/0123823 A1 | 5/2008 | Pirzada et al. |
| 2005/0204001 A1 | 9/2005 | Stein et al. | | 2008/0159632 A1 | 7/2008 | Oliver et al. |
| 2005/0216564 A1 | 9/2005 | Myers et al. | | 2008/0175226 A1 | 7/2008 | Alperovitch et al. |
| 2005/0256866 A1 | 11/2005 | Lu et al. | | 2008/0175266 A1 | 7/2008 | Alperovitch et al. |
| 2005/0262209 A1 | 11/2005 | Yu | | 2008/0177684 A1 | 7/2008 | Laxman et al. |
| 2005/0262210 A1 | 11/2005 | Yu | | 2008/0177691 A1 | 7/2008 | Alperovitch et al. |
| 2005/0262556 A1* | 11/2005 | Waisman et al. ................ 726/22 | | 2008/0178259 A1 | 7/2008 | Alperovitch et al. |
| 2006/0007936 A1 | 1/2006 | Shrum et al. | | 2008/0178288 A1 | 7/2008 | Alperovitch et al. |
| 2006/0009994 A1 | 1/2006 | Hogg et al. | | 2008/0184366 A1 | 7/2008 | Alperovitch et al. |
| 2006/0015563 A1 | 1/2006 | Judge et al. | | 2008/0301755 A1 | 12/2008 | Sinha et al. |
| 2006/0015942 A1 | 1/2006 | Judge et al. | | 2008/0303689 A1 | 12/2008 | Iverson |
| 2006/0021055 A1 | 1/2006 | Judge et al. | | 2009/0003204 A1 | 1/2009 | Okholm et al. |
| 2006/0023940 A1 | 2/2006 | Katsuyama | | 2009/0089279 A1 | 4/2009 | Jeong et al. |
| 2006/0031314 A1 | 2/2006 | Brahms et al. | | 2009/0103524 A1 | 4/2009 | Mantripragada et al. |
| 2006/0031483 A1 | 2/2006 | Lund et al. | | 2009/0113016 A1 | 4/2009 | Sen et al. |
| 2006/0036693 A1 | 2/2006 | Hulten et al. | | 2009/0119740 A1 | 5/2009 | Alperovitch et al. |
| 2006/0036727 A1 | 2/2006 | Kurapati et al. | | 2009/0122699 A1 | 5/2009 | Alperovitch et al. |
| 2006/0041508 A1 | 2/2006 | Pham et al. | | 2009/0125980 A1 | 5/2009 | Alperovitch et al. |

| | | | |
|---|---|---|---|
| 2009/0164582 A1 | 6/2009 | Dasgupta et al. | |
| 2009/0192955 A1 | 7/2009 | Tang et al. | |
| 2009/0254499 A1 | 10/2009 | Deyo | |
| 2009/0254572 A1 | 10/2009 | Redlich et al. | |
| 2009/0254663 A1 | 10/2009 | Alperovitch et al. | |
| 2009/0282476 A1 | 11/2009 | Nachenberg et al. | |
| 2010/0115040 A1 | 5/2010 | Sargent et al. | |
| 2010/0306846 A1 | 12/2010 | Alperovitch et al. | |
| 2011/0280160 A1 | 11/2011 | Yang | |
| 2011/0296519 A1 | 12/2011 | Ide et al. | |
| 2012/0011252 A1 | 1/2012 | Alperovitch et al. | |
| 2012/0084441 A1 | 4/2012 | Alperovitch et al. | |
| 2012/0110672 A1 | 5/2012 | Judge et al. | |
| 2012/0174219 A1 | 7/2012 | Hernandez et al. | |
| 2012/0204265 A1 | 8/2012 | Judge | |
| 2012/0216248 A1 | 8/2012 | Alperovitch et al. | |
| 2012/0239751 A1 | 9/2012 | Alperovitch et al. | |
| 2012/0240228 A1 | 9/2012 | Alperovitch et al. | |

FOREIGN PATENT DOCUMENTS

| | | |
|---|---|---|
| AU | 2006315184 | 5/2007 |
| AU | 2008207924 | 7/2008 |
| AU | 2008207926 | 7/2008 |
| AU | 2008207930 | 7/2008 |
| AU | 2008323779 | 5/2009 |
| AU | 2008323784 | 5/2009 |
| AU | 2009203095 | 8/2009 |
| CA | 2478299 | 9/2003 |
| CA | 2564533 A1 | 12/2005 |
| CA | 2586709 | 5/2006 |
| CA | 2628189 | 5/2007 |
| CA | 2654796 | 12/2007 |
| CN | 10140166 | 4/2009 |
| CN | 101443736 | 5/2009 |
| CN | 101730892 | 6/2010 |
| CN | 101730904 | 6/2010 |
| CN | 101730903 | 11/2012 |
| CN | 103095672 | 5/2013 |
| EP | 375138 A2 | 6/1990 |
| EP | 413537 A2 | 2/1991 |
| EP | 420779 A2 | 4/1991 |
| EP | 720333 A2 | 7/1996 |
| EP | 838774 A2 | 4/1998 |
| EP | 869652 A2 | 10/1998 |
| EP | 907120 A2 | 4/1999 |
| EP | 1326376 A2 | 7/2003 |
| EP | 1488316 | 12/2004 |
| EP | 1271846 A3 | 7/2005 |
| EP | 1672558 A2 | 6/2006 |
| EP | 1819108 A2 | 8/2007 |
| EP | 1820101 | 8/2007 |
| EP | 1982540 | 10/2008 |
| EP | 2036246 | 3/2009 |
| EP | 2115642 | 11/2009 |
| EP | 2115689 | 11/2009 |
| EP | 2213056 | 8/2010 |
| EP | 2223258 | 9/2010 |
| EP | 2562975 | 2/2013 |
| EP | 2562976 | 2/2013 |
| EP | 2562986 | 2/2013 |
| EP | 2562987 | 2/2013 |
| GB | 2271002 B | 12/1995 |
| GB | 2357932 | 7/2001 |
| IN | 3279-DELNP-2007 | 8/2007 |
| IN | 4233-DELNP-2007 | 8/2008 |
| IN | 4842/CHENP/2009 | 1/2010 |
| IN | 4763/CHENP/2009 | 7/2010 |
| JP | 2000148276 A | 5/2000 |
| JP | 2000215046 A | 8/2000 |
| JP | 2001028006 A | 1/2001 |
| JP | 2003-150482 | 5/2003 |
| JP | 2004-533677 | 11/2004 |
| JP | 2004537075 A | 12/2004 |
| JP | 2005-520230 | 7/2005 |
| JP | 2006268544 A | 10/2006 |
| JP | 18350870 A | 12/2006 |
| JP | 2007-540073 | 6/2008 |
| JP | 2008519532 A | 6/2008 |
| JP | 2009-516269 | 4/2009 |
| KR | 10-0447082 | 9/2004 |
| KR | 2006-0012137 | 2/2006 |
| KR | 2006012137 A | 2/2006 |
| KR | 2006-0028200 | 3/2006 |
| KR | 2006028200 A | 3/2006 |
| KR | 2006041934 A | 5/2006 |
| KR | 10-0699531 | 3/2007 |
| KR | 699531 B1 | 3/2007 |
| KR | 10-0737523 | 7/2007 |
| KR | 737523 B1 | 7/2007 |
| KR | 10-0750377 | 8/2007 |
| KR | 750377 B1 | 8/2007 |
| KR | 447082 Y1 | 12/2009 |
| SG | 106744 | 11/2004 |
| SG | 142513 | 6/2008 |
| WO | WO9635994 A1 | 11/1996 |
| WO | WO9905814 A3 | 4/1999 |
| WO | WO9937066 A1 | 7/1999 |
| WO | WO9933188 A3 | 8/1999 |
| WO | WO0007312 A1 | 2/2000 |
| WO | WO0008543 A1 | 2/2000 |
| WO | WO0042748 A1 | 7/2000 |
| WO | WO 00/59167 | 10/2000 |
| WO | WO 01/22686 | 3/2001 |
| WO | WO0180480 A1 | 10/2001 |
| WO | WO0117165 A3 | 11/2001 |
| WO | WO0150691 A3 | 12/2001 |
| WO | WO 02/15521 | 2/2002 |
| WO | WO0176181 A3 | 3/2002 |
| WO | WO0188834 A3 | 5/2002 |
| WO | WO02013469 A3 | 9/2002 |
| WO | WO02075547 A1 | 9/2002 |
| WO | WO02082293 A1 | 10/2002 |
| WO | WO02091706 A1 | 11/2002 |
| WO | WO02013489 A3 | 1/2003 |
| WO | WO 03/077071 | 9/2003 |
| WO | WO2004061698 A1 | 7/2004 |
| WO | WO2004061703 A1 | 7/2004 |
| WO | WO2004081734 A2 | 9/2004 |
| WO | WO2004088455 A2 | 10/2004 |
| WO | WO 2005/006139 | 1/2005 |
| WO | WO2005086437 A1 | 9/2005 |
| WO | WO 2005/119485 | 12/2005 |
| WO | WO 2005/119488 | 12/2005 |
| WO | WO 2006/029399 | 3/2006 |
| WO | WO 2006/119509 | 3/2006 |
| WO | WO 2006/052736 | 5/2006 |
| WO | WO2007030951 A1 | 3/2007 |
| WO | WO2005116851 A3 | 4/2007 |
| WO | WO 2007/059428 | 5/2007 |
| WO | WO 2007/144696 | 12/2007 |
| WO | WO 2007/146690 | 12/2007 |
| WO | WO 2007/146696 | 12/2007 |
| WO | WO 2007/146701 | 12/2007 |
| WO | WO 2008/008543 | 1/2008 |
| WO | WO 2008/091980 | 7/2008 |
| WO | WO 2008/091982 | 7/2008 |
| WO | WO 2008/091986 | 7/2008 |
| WO | WO 2009/146118 | 2/2009 |
| WO | WO 2009/062018 | 5/2009 |
| WO | WO 2009/062023 | 5/2009 |

OTHER PUBLICATIONS

Japanese Office Action for JP Application No. 2008-540356, dated Sep. 21, 2011, 2 pages.

Notification Concerning Availability of the Publication of the International Application, PCT/US2006/060771, dated Apr. 17, 2008, 4 pages.

Natsev, Apostol et al. "WALRUS: A Similarity Retrieval Algorithm for Image Databases," Mar. 2004.

Schleimer, Saul eta I. "Winnowing: Local Algorithms for Document Fingerprinting," Jun. 2003.

PCT Notification of International Search Report & Written Opinion, PCT/US2005/039978, mailed Jul. 8, 2008, 14 pages.

PCT Notification Concerning Transmittal of International Preliminary Report on Patentability, PCT/US2005/039978, mailed May 14, 2009, 10 pages.

Abika.com, "Trace IP address, email or IM to owner or use," http://www.abika.com/help/IPaddressmap.htm, 3pp. (Jan. 25, 2006).
Abika.com, "Request a Persons Report," http:www.abika.com/forms/Verifyemailaddress.asp, 1 page, (Jan. 26, 2006).
Aikawa,Narichika, Q&A Collection: Personal computers have been introduced to junior high schools and accessing to the Internet has been started; however, we want to avoid the students from accessing harmful information. What can we do?, DOS/V POWER REPORT, vol. 8, No. 5, Japan, Impress Co., Ltd., 1998, May 1, pp. 358-361.
Ando, Ruo, Real-time neural detection with network capturing, Study report from Information Processing Society of Japan, vol. 2002, No. 12, IPSJ SIG Notes, Information Processing Society of Japan, Feb. 15, 2002, pp. 145-150.
Article entitled "A Comparative Study on Feature Selection in Text Categorization" by Yang et. al., Machine Learning—International Workshop Then Conference, pp. 412-420, Jul. 1997.
Article entitled "A Comparison of Classifiers and Document Representations for the Routing Problem" by Schutze, 1995, pp. 229-237.
Article entitled "A Comparison of Two Learning Algorithms for Text Categorization" by Lewis et al., in Third Annual Symposium on Document Analysis and Information Retrieval, Apr. 11-13, 1994, pp. 81-92.
Article entitled "A DNS Filter and Switch for Packet-filtering Gateways" by Cheswick et al., in Proc. of the Sixth Annual USENIX Security Symposium: Focusing on Applications of Cryptography, Jul. 22-25, 1996, pp. 15-19.
Article entitled "A Secure Email Gateway (Building an RCAS External Interface)" by Smith, in Tenth Annual Computer Security Applications Conference, Dec. 5-9, 1994, pp. 202-211.
Article entitled "A Short Tutorial on Wireless LANs and IEEE 802.11" by Lough et al., printed May 27, 2002, in the IEEE Computer Society's Student Newsletter, Summer 1997, vol. 5, No. 2, 6 pages.
Article entitled "A Toolkit and Methods for Internet Firewalls" by Ranum et. al., in Proc. of USENIX Summer 1994 Technical Conference, Jun. 6-10, 1994, pp. 37-44.
Article entitled "An Evaluation of Phrasal and Clustered Representations on a Text Categorization Task" by Lewis, in 15th Ann Int'l SIGIR, Jun. 1992, pp. 37-50.
Article entitled "An Example-Based Mapping Method for Text Categorization and Retrieval" by Yang et. al., in ACM Transactions on Information Systems, Jul. 1994, vol. 12, No. 3, pp. 252-277.
Article entitled "Automating the OSI to Internet Management Conversion Through the Use of an Object-Oriented Platform" by Pavlou et al., in Proc. of the IFIP TC6/WG6.4 International Conference on Advanced Information Processing Techniques for LAN and MAN Management, Apr. 7-9, 1993, pp. 245-260.
Article entitled "CAFE: A Conceptual Model for Managing Information in Electronic Mail" by Takkinen et al. in Proc. 31st Annual Hawaii International Conference on System Sciences, 1998, pp. 44-53.
Article entitled "Classification of Text Documents" by Li et. al., in The Computer Journal, vol. 41, No. 8, 1998, pp. 537-546.
Article entitled "Design of the TTI Prototype Trusted Mail Agent" by Rose et. al., in Computer Message Systems-85: Proc. of the IFIP TC 6 International Symposium on Computer Message Systems, Sep. 5-7, 1985, pp. 377-399.
Article entitled "Designing an Academic Firewall: Policy, Practice, and Experience with SURF" by Greenwald et. al., in Proc. of the 1996 Symposium on Network and Distributed Systems Security, 1996, pp. 1-14.
Article entitled "Firewall Systems: The Next Generation" by McGhie, in Integration Issues in Large Commercial Media Delivery Systems: Proc. of SPIE—The International Society for Optical Engineering, Oct. 23-24, 1995, pp. 270-281.
Article entitled "Firewalls for Sale" by Bryan, in BYTE, Apr. 1995, pp. 99-104.
Article entitled "Hierarchical Bayesian Clustering for Automatic Text Classification" by Iwayama et al. in Natural Language, 1995, pp. 1322-1327.
Article entitled "Hierarchically classifying documents using very few words" by Koller et. al., in Proceedings of the Fourteenth International Conference on Machine Learning, 1997, 9 pages.

Article entitled "Implementing a Generalized Tool for Network Monitoring" by Ranum et. al. in LISA XI, Oct. 26-31, 1997, pp. 1-8.
Article entitled "Integralis' Minesweeper defuses E-mail bombs" by Kramer et. al., in PC Week, Mar. 18, 1996, pp. N17-N23.
Article entitled "Issues when designing filters in messaging systems" by Palme et. al., in 19 Computer Communications, 1996, pp. 95-101.
Article entitled "Learning Limited Dependence Bayesian Classifiers" by Sahami, in Proceedings of the Second International Conference on Knowledge Discovery and Data Mining, 1996, pp. 335-338.
Article entitled "Learning Rules that Classify E-mail" by Cohen, 1996, pp. 1-8.
Article entitled "Method for Automatic Contextual Transposition Upon Receipt of Item of Specified Criteria" printed Feb. 1994 in IBM Technical Disclosure Bulletin, vol. 37, No. 2B, p. 333.
Article entitled "MIMEsweeper defuses virus network, 'net mail bombs" by Avery, in Info World, May 20, 1996, vol. 12, No. 21, p. N1.
Article entitled "Safe Use of X Window System Protocol Across a Firewall" by Kahn, in Proc. of the Fifth USENIX UNIX Security Symposium, Jun. 5-7, 1995, pp. 105-116.
Article entitled "Secure External References in Multimedia Email Messages" by Wiegel, in 3rd ACM Conference on Computer and Communications Security, Mar. 14-16, 1996, pp. 11-18.
Article entitled "Securing Electronic Mail Systems" by Serenelli et al., in Communications-Fusing Command Control and Intelligence: MILCOM '92, 1992, pp. 677-680.
Article entitled "Securing the Web: fire walls, proxy servers, and data driven attacks" by Farrow in InfoWorld, Jun. 19, 1995, vol. 17, No. 25, p. 103.
Article entitled "Sendmail and Spam" by LeFebvre in Performance Computing, Aug. 1998, pp. 55-58.
Article entitled "Smokey: Automatic Recognition of Hostile Messages" by Spertus in Innovative Applications 1997, pp. 1058-1065.
Article entitled "Spam!" by Cranor et. al. in Communications of the ACM, vol. 41, No. 8, Aug. 1998, pp. 74-83.
Article entitled "Stomping out mail viruses" by Wilkerson, in PC Week, Jul. 15, 1996, p. N8.
Article entitled "Text Categorization with Support Vector Machines: Learning with Many Relevant Features" by Joachins in Machine Learning: ECML-98, Apr. 1998, pp. 1-14.
Article entitled "Toward Optimal Feature Selection" by Koller et al., in Machine Learning: Proc. of the Thirteenth International Conference, 1996, 9 pages.
Article entitled "X Through the Firewall, and Other Application Relays" by Treese et. al. in Proc. of the USENIX Summer 1993 Technical Conference, Jun. 21-25, 1993, pp. 87-99.
Book entitled Machine Learning by Mitchell, 1997, pp. 180-184.
Examiner's Report for Australian Patent Application No. 2006315184, dated Mar. 31, 2010, 8 pages.
European Supplementary Search Report for EP Application No. 03723691.6 dated Jun. 29, 2010, 6 pages.
China Patent Agent (H.K.) Ltd., First Office Action for Chinese Patent Application No. 200680050707.7, dated Mar. 9, 2010, 31 pages.
Memo entitled "SOCKS Protocol Version 5" by Leech et. al., in Standards Track, Mar. 1996, 10 pages.
First/Consequent Examination Report for IN Application No. 2639/DELNP/2004, Apr. 8, 2011, 3 pages.
Official Action (with uncertified Translation), Japanese Patent Application No. 2003-575222, Sep. 25, 2009, 13 pages.
Office Action for JP Application No. 2007-540073, dated Dec. 14, 2010 (with translation), 9 pages.
Kane, Paul J. et al. "Quantification of Banding, Streaking and Grain in Flat Field Images," 2000, 5 pages.
Kim, JiSoo et al. "Text Locating from Natural Scene Images Using Image Intensities," 2005 IEEE, 5 pages.
Lane, Terran et al., "Sequence Matching and Learning in Anomaly Detection for Computer Security," AAAI Technical Report WS-97-07, 1997, pp. 43-49.
Shishibori, Masami et al., "A Filtering Method for Mail Documents Using Personal Profiles," IEICE Technical Report, The Institute of Electronics, Information and Communication Engineers, vol. 98, No. 486, Dec. 17, 1998, pp. 9-16.

Sobottka, K. et al. "Text extraction from colored book and journal covers," 2000, pp. 163-176.
Thomas, R. et al. "The Game Goes On: An Analysis of Modern SPAM Techniques," 2006.
US Patent and Trademark Office Final Office Action Summary for U.S. Appl. No. 11/423,329, mailed Jan. 14, 2010, 21 pages.
US Patent and Trademark Office Nonfinal Office Action Summary for U.S. Appl. No. 11/423,329, mailed Jun. 29, 2009, 43 pages.
US Patent and Trademark Office Nonfinal Office Action Summary for U.S. Appl. No. 11/626,470, mailed Jan. 19, 2010, 45 pages.
US Patent and Trademark Office Final Office Action Summary for U.S. Appl. No. 11/626,470, mailed Sep. 21, 2010, 36 pages.
US Patent and Trademark Office Nonfinal Office Action Summary for U.S. Appl. No. 11/626,470, mailed Oct. 18, 2011, 57 pages.
US Patent and Trademark Office Nonfinal Office Action Summary for U.S. Appl. No. 11/142,943, mailed Jun. 26, 2008, 59 pages.
US Patent and Trademark Office Final Office Action Summary for U.S. Appl. No. 11/142,943, mailed Apr. 29, 2009, 18 pages.
US Patent and Trademark Office Nonfinal Office Action Summary for U.S. Appl. No. 11/142,943, mailed Dec. 31, 2009, 15 pages.
US Patent and Trademark Office Restriction Requirement for U.S. Appl. No. 11/142,943, mailed Jan. 13, 2009, 7 pages.
US Patent and Trademark Office Nonfinal Office Action Summary for U.S. Appl. No. 11/142,943, mailed Sep. 16, 2010, 7 pages.
US Patent and Trademark Office Final Office Action Summary for U.S. Appl. No. 11/937,274, mailed Aug. 26, 2010, 29 pages.
US Patent and Trademark Office Nonfinal Office Action Summary for U.S. Appl. No. 11/937,274, mailed Dec. 9, 2009, 53 pages.
US Patent and Trademark Office Nonfinal Office Action Summary for U.S. Appl. No. 11/937,274, mailed Jun. 29, 2009, 46 pages.
US Patent and Trademark Office Nonfinal Office Action Summary for U.S. Appl. No. 11/626,603, mailed Dec. 2, 2009, 47 pages.
US Patent and Trademark Office Final Office Action Summary for U.S. Appl. No. 11/626,603, mailed Mar. 28, 2011, 35 pages.
US Patent and Trademark Office Non-Final Office Action Summary for U.S. Appl. No. 11/626,603, mailed Jul. 13, 2010, 27 pages.
US Patent and Trademark Office Restriction Requirement for U.S. Appl. No. 11/626,603, mailed Aug. 11, 2009, 7 pages.
US Patent and Trademark Office Nonfinal Office Action Summary for U.S. Appl. No. 11/626,479, mailed Mar. 17, 2010, 65 pages.
Website: Atabok VCN Auto-Exchange™—Atabok Related Produces, www.atabok.com, Feb. 19, 2002, 1 page.
Website: Atabok VCNMAIL ™ Secure Email Solution—Atabok Related Produces, www.atabok.com, Feb. 19, 2002, pp. 1-2.
Website: Baltimore Focus on e-Security—Baltimore Technologies, www.baltimore.com, Feb. 19, 2002, pp. 1-2.
Website: Control Your Confidential Communications with Atabok—Atabok Related Produces, www.atabok.com, Feb. 19, 2002, 1 page.
Website: Controlling Digital Assets Is a Paramount Need for All Business—Atabok Related Produces, www.atabok.com, Feb. 19, 2002, 1 page.
Website: Create Secure Internet Communication Channels—Atabok Homepage, www.atabok.com, Feb. 19, 2002, pp. 1-3.
Website: E-mail Plug-in—Features and Benefits—Entrust Entelligence, www.entrust.com, Feb. 19, 2002, pp. 1-2.
Website: E-mail Plug-in—Get Technical/Interoperability—Entrust Entelligence, www.entrust.com, Feb. 19, 2002, 1 page.
Website: E-mail Plug-in—Get Technical/System Requirements—Entrust Entelligence, www.entrust.com, Feb. 19, 2002, 1 page.
Website: Entrust Entelligence—Entrust Homepage. www.entrust.com, Feb. 19, 2002, 1 page.
Website: ESKE—Email with Secure Key Exchange—ESKE. www.danu.ie, Feb. 19, 2002, 1 page.
Website: Go Secure! for Microsoft Exchange—Products/Services—Verisign, Inc, www.verisign.com, retrieved prior to Jul. 13, 2006, 2 pages.
Website: Internet Filtering Software—Internet Manager Homepage. www.elronsw.com, Feb. 19, 2002.
Website: Technical Focus—Products—Entegrity AssureAccess, www2.entegrity.com, Feb. 19, 2002, pp. 1-4.
Website: Terminet—ESKE, www.danu.ie, Feb. 19, 2002, 1 page.
PCT Notification of Search Report & Written Opinion, PCT/US2008/082781, Nov. 7, 2008, 12 pages.

PCT Notification of International Search Report & Written Opinion, PCT/US2009/039401, mailed Nov. 16, 2009, 14 pages.
PCT Notification of International Search Report & Written Opinion, PCT/US2009/039401, mailed Oct. 14, 2010, 9 pages.
Official Action (with uncertified Translation), Japanese Patent Application No. 2007-540073, Jul. 7, 2011, 4 pages.
PCT Notification Concerning Transmittal of International Preliminary Report on Patentability, PCT/US2008/051865, mailed Aug. 6, 2009, 16 pages.
PCT Notification of International Search Report & Written Opinion, PCT/US2008/051869, mailed Jun. 5, 2008, 11 pages.
PCT Notification Concerning Transmittal of International Preliminary Report on Patentability, PCT/US2008/051PCT/US2008/051876, mailed Aug. 6, 2009, 8 pages.
PCT Notification Concerning Transmittal of International Preliminary Report on Patentability, PCT/US2008/082771, mailed May 20, 2010, 10 pages.
PCT Notification of International Search Report & Written Opinion, PCT/US2008/082771, mailed Apr. 24, 2009, 14 pages.
US Patent and Trademark Office final Office Action Summary for U.S. Appl. No. 11/626,568, mailed Aug. 24, 2011, 17 pages.
US Patent and Trademark Office non-final Office Action Summary for U.S. Appl. No. 11/626,568, mailed Dec. 15, 2010, 16 pages.
Supplementary European Search Report, PCT Application No. PCT/US2006/060771, dated Dec. 3, 2010, 7 pages.
Supplementary European Search Report, PCT Application No. PCT/US2006/060771, dated Dec. 21, 2010, 1 page.
Luk, W., et al. "Incremental Development of Hardware Packet Filters", Proc. International Conference on Engineering of Reconfigurable Systems and Algorithms (ERSA). Jan. 1, 2001. pp. 115-118. XP055049950. Retrieved from the Internet: URL:www.doc.ic.ac.uk/-sy99/c1.ps.
Georgopoulos, C. et al., "A Protocol Processing Architecture Backing TCP/IP-based Security Applications in High Speed Networks". Interworking 2000. Oct. 1, 2000. XP055049972. Bergen. Norway Available online at <URL:http://pelopas.uop.gr/-fanis/html_files/pdf_files/papers/invited/I2_IW2002.pdf>.
"Network Processor Designs for Next-Generation Networking Equipment". White Paper Ezchip Technologies. XX. XX. Dec. 27, 1999. pages 1-4. XP002262747.
Segal, Richard, et al. "Spam Guru: An Enterprise Anti-Spam Filtering System", IBM, 2004 (7 pages).
Yang et al., "An Example-Based Mapping Method for Text Categorization and Retrieval", ACM Transactions on Information Systems, Jul. 1994, vol. 12, No. 3, pp. 252-277.
Nilsson, Niles J., "Introduction to Machine Learning, an Early Draft of a Proposed Textbook", Nov. 3, 1998; XP055050127; available online at <URL http://robotics.stanford.edu/~nilsson/MLBOOK.pdf>.
Androutsopoulos, Ion et al., "Learning to Filter Spam E-Mail: A Comparison of a Naive Bayesian and a Memory-Based Approach"; Proceedings of the Workshop "Machine Learning and Textual Information Access"; 4th European Conference on Principles and Practice of Knowledge Discovery in Databases (PKDD-2000). Sep. 1, 2000 [XP055050141] Lyon, France; available online at <URL http://arxiv.org/ftp/cs/papers/0009/0009009.pdf>.
Rennie, J D M, "iFile: An application of Machine Learning to E-Mail Filtering"; Workshop on Text Mining; Aug. 1, 2000. [XP002904311]. pp. 1-6.
Lewis et al., "A Comparison of Two Learning Algorithms for Text Categorization", Third Annual Symposium on Document Analysis and Information Retrieval, Apr. 11-13, 1994, pp. 81-92.
Sahami, "Learning Limited Dependence Bayesian Classifiers", Proceedings of the Second International Conference on Knowledge Discovery and Data Mining, pp. 335-338, 1996.
Lewis, "An Evaluation of Phrasal and Clustered Representations on a Text Categorization Task", 15th Ann Int'l SIGIR, Jun. 1992, pp. 37-50.
Michell, "Machine Learning" (Book), 1997, pp. 180-184.
Cohen, "Learning Rules that Classify E-mail", pp. 1-8; Conference Machine Learning in Information Access-Spring Symposium-Technical Report-American Association for Artificial Intelligence SSS, AAAI Press, Mar. 1996.

Koller, et al., "Hierarchically classifying documents using very few words", in Proceedings of the Fourteenth International Conference on Machine Learning, 1997.
Li et. al., "Classification of Text Documents", The Computer Journal, vol. 41, No. 8, 1998, pp. 537-546.
Palme et. al., "Issues when designing filters in messaging systems", 19 Computer Communications, 1996, pp. 95-101.
Joachins, "Text Categorization with Support Vector Machines: Learning with Many Relevant Features", Machine Learning: ECML-98, Apr. 1998, pp. 1-14.
Iwayama et al., "Hierarchical Bayesian Clustering for Automatic Text Classification", Department of Computer Science, Tokyo Institute of Technology, ISSN 0918-2802, Aug. 1995, 10 pages.
Spertus, "Smokey: Automatic Recognition of Hostile Messages", Innovative Applications 1997, pp. 1058-1065.
Schutze, "A Comparison of Classifiers and Document Representations for the Routing Problem", pp. 229-237; Publication 1996.
Takkinen et al., "CAFE: A Conceptual Model for Managing Information in Electronic Mail", Proc. 31st Annual Hawaii International Conference on System Sciences, 1998, pp. 44-53.
Yang et. al., "A Comparative Study on Feature Selection in Text Categorization", Machine learning—International Workshop Then Conference, p. 412-420, Jul. 1997.
Cranor et. al., "Spam!", Communications of The ACM, vol. 41, No. 8, Aug. 1998, pp. 74-83.
LeFebvre, "Sendmail and Spam", Performance Computing, Aug. 1998, pp. 55-58.
Ranum et. Al, "Implementing a Generalized Tool for Network Monitoring", Lisa Xi, Oct. 26-31, 1997, pp. 1-8.
"Method for Automatic Contextual Transposition Upon Receipt of item of Specified Criteria" printed Feb. 1994 in IBM Technical Disclosure Bulletin, vol. 37, No. 2B, p. 333.
Koller et al., "Toward Optimal Feature Selection", Machine Learning: Proc. of the Thirteenth International Conference, 1996.
Avery, "MIMEsweeper defuses virus network, 'net mail bombs", info World, May 20, 1996, vol. 12, No. 21, p. N1.
Wilkerson, "Stomping out mail viruses", in PC Week, Jul. 15, 1996, p. N8.
Serenelli et al., "Securing Electronic Mail Systems", Communications-Fusing Command Control and Intelligence: MILCOM '921992, pp. 677-680.
Kramer et. al., "Integralis' Minesweeper defuses E-mail bombs", PC Week, Mar. 18, 1996, p. N17-N23.
Ranum et. al., "A Toolkit and Methods for Internet Firewalls", Proc. of USENIX Summer 1994 Technical ConferenceJun. 6-10, 1994, pp. 37-44.
McGhie, "Firewall Systems: The Next Generation", Integration issues in Large Commerical Media Delivery Systems: Proc. of SPIE-The International Society for Optical Engineering, Oct. 23-24, 1995, pp. 270-281.
Rose et. al., "Design of the TTI Prototype Trusted Mail Agent", Computer Message Systems-85: Proc. of the IFIP TC 6 International Symposium on Computer Message Systems, Sep. 5-7, 1985, pp. 377-399.
Greenwald et. al., "Designing an Academic Firewall: Policy, Practice, and Experience with SURF", Proc. of the 1996 Symposium on Network and Distributed Systems Security, 1996, pp. 1-14.
Tresse et. al., "X Through the Firewall, and Other Application Relays", Proc. of the USENIX Summer 1993 Technical Conference, Jun. 21-25, 1993, pp. 87-99.
Bryan, "Firewalls for Sale", BYTE, Apr. 1995, pp. 99-104.
Cheswick et al., "A DNS Filter and Switch for Packett-filtering Gateways", Proc. of the Sixth Annual USENIX Security Symposium: Focusing on Applications of Cryptography, Jul. 22-25, 1996, pp. 15-19.
Kahn, "Safe Use of X Window System Protocol Across a Firewall", Proc. of the Fifth USENIX UNIX Security Symposium, Jun. 5-7, 1995, pp. 105-116.
Pavlou et al., "Automating the OSI to Internet Management Conversion Through the Use of an Object-Oriented Platform", Proc. of the IFIP TC6/WG6.4 International Conference on Advanced Information Processing Techniques for Lan and Man Management, Apr. 7-9, 1993, pp. 245-260.
Krishnaswamy et al—Verity: A QoS Metric for Selecting Web Services and Providers, Proceedings of the Fourth International Conference on Web Information Systems Engineering Workshops (WISEW'03), IEEE, 2004.
Kamvar et al., The EigenTrust Algorithm for Reputation Management in P2P Networks, ACM, WWW2003, Budapest, Hungary, May 20-24, 2003, pp. 640-651.
Blum, Richard, Open Source E-Mail Security, Sams XP009166200, ISBN 978-0-672-32237-2, pp. 139-158.
Clayton, Richard, "Good Practice for Combating Unsolicited Bulk Email," Demon Internet, May 18, 1999 (16 pages).
Smith, "A Secure Email Gateway (Building an RCAS External Interface)", in Tenth Annual Computer Security Applications Conference, Dec. 5-9, 1994, pp. 202-211.
Wiegel, "Secure External References in Multimedia Email Messages", 3rd ACM Conference on Computer and Communications SecurityMar. 14-16, 1996, pp. 11-18.
Leech et. al., Memo entitled "SOCKS Protocol Version 5", Standards Track, Mar. 1996, pp. 1-9.
Farrow, "Securing the Web: fire walls, proxy, servers, and data driven attacks", InfoWorld, Jun. 19, 1995, vol. 17, No. 25, p. 103.
Ando, Ruo, "Real-time neural detection with network capturing", Study report from Information Processing Society of Japan, vol. 2002, No. 12, IPSIG SIG Notes, Information Processing Society of Japan, 2002, Feb. 15, 2002, p. 145-150.
Aikawa, Narichika, "Q&A Collection: Personal computers have been introduced to junior high schools and accessing to the Internet has been started; however, we want to avoid the students from accessing harmful information. What can we do?", DOS/V Power Report, vol. 8, No. 5, Japan, Impress Co., Ltd., May 1, 1998, p. 358 to 361.
Abika.com, "Trace IP address, email or IM to owner or user" http://www.abika.com/help/IPaddressmap.htm, 3 pp. (Jan. 25, 2006).
Abika.com, "Request a Persons Report", http://www.abika.com/forms/Verifyemailaddress.asp, 1 p. (Jan. 26, 2006).
Lough et al., "A Short Tutorial on Wireless LANs and IEEE 802.11", printed on May 27, 2002, in the IEEE Computer Society's Student Newsletter, Summer 1997, vol. 5, No. 2.
Feitelson et al., "Self-Tuning Systems", Mar./Apr. 1999, IEEE, 0740-7459/99, pp. 52-60.
Anklesaria, F. et al., "The Internet Gopher Protocol", RFC 1436, Mar. 1993.
Berners-Lee, T. et al., "Uniform Resource Identifiers (URI): Generic Syntax", RFC 2396, Aug. 1998.
Crispin, M., "Internet Message Access Protocol—Version 4rev1", RFC 2060, Dec. 1996.
Franks, J. et al., "HITP Authentication: Basic and Digest Access Authentication", RFC 2617, Jun. 1999.
Klensin, J. et al., "SMTP Service Extensions", RFC 1869, Nov. 1995.
Moats, R., "URN Syntax", RFC 2141, May 1997.
Moore, K., "SMTP Service Extension for Delivery Status Notifications", RFC 1891, Jan. 1996.
Myers, J. et al., "Post Office Protocol—Version 3", RFC 1939, May 1996.
Nielsen, H., et al., "An HTTP Extension Framework", RFC 2774, Feb. 2000.
Postel, J., "Simple Mail Transfer Protocol", RFC 821, Aug. 1982.
IronMail™ Version 2.1, User's Manual. © 2001, published by CipherTrust, Inc., 114 pp. [Cited in U.S. Appl. No. 10/361,067].
IronMail™ version 2.5, User's Manual, © 2001, published by CipherTrust, Inc., 195 pp. [Cited in U.S. Appl. No. 10/361,067].
IronMail™ version 2.5.1, User's Manual, © 2001, published by CipherTrust, Inc., 203 pp. [Cited in U.S. Appl. No. 10/361,067].
IronMail™ version 3.0, User's Manual, © 2002, published by CipherTrust, Inc., 280 pages.
IronMail™ version 3.0.1, User's Manual, © 2002, published by CipherTrust, Inc., 314 pages.
IronMailTM version 3.1, User's Manual, published by CipherTrust, Inc., 397 pages [Cited in U.S. Appl. No. 10/361,067].
Website: Exchange Business Information Safely & Quickly—Without Compromising Security or Reliability—Atabok Secure Data Solutions, Feb. 19, 2002, 2 pages.
Braden, R., "Requirements for Internet Hosts—Application and Support", RFC 1123, Oct. 1989, 98 pages.

Fielding, R. et al., "Hypertext Transfer Protocol—HTTP/1.1", RFC 2616, Jun. 1999, 114 pages.

Yuchun Tang, "Granular Support Vector Machines Based on Granular Computing, Soft Computing and Statistical Learning." Georgia State University: May 2006.

Drucker et al; "Support Vector Machines for Spam Categorization"; 1999; IEEE Transactions on Neural Networks; vol. 10, No. 5; pp. 1048-1054.

Graf et al.; "Parallel Support Vector Machines: The Cascade SVM"; 2005; pp. 1-8.

Rokach, Lior et al.; "Decomposition methodology for classification tasks"; 2005; Springer-Verlag London Limited; Pattern Analysis & Applications; pp. 257-271.

Wang, Jigang et al.; "Training Data Selection for Support Vector Machines"; 2005; ICNC 2005, LNCS 3610; pp. 554-564.

Skurichina, Marina et al.; Bagging, Boosting and the Random Subspce Method for Linear Classifiers; 2002; Springer-Verlag London Limited; pp. 121-135.

Tao, Dacheng et al.; "Asymmetric Bagging and Random Subspace for Support Vector Machines-Based Relevance Feedback in Image Retrieval"; 2006; IEEE Computer Society; pp. 1088-1099.

Kotsiantis, S. B. et al.; "Machine learning: a review of classification and combining techniques"; 2006; Springer; Artificial Intelligence Review; pp. 159-190.

Kane, Paul J. et al. "Quantification of Banding, Streaking and Grain in Flat Field Images", 2000.

Kim, JiSoo et al. "Text Locating from Natural Scene Images Using Image Intensities", 2005 IEEE.

Gupta, et al., "A Reputation System for Peer-to-Peer Networks," ACM (2003).

Golbeck, et al., "Inferring Reputation on the Semantic Web," ACM, 2004.

Okumura, Motonobu, "E-Mail Filtering by Relation Learning", IEICE Technical Report, vol. 103, No. 603, the Institute of Electronics, Information and Communication Engineers, Jan. 19, 2004, vol. 103, p. 1-5 [English Abstract Only].

Inoue, Naomi, "Computer and Communication: Recent State of Filtering Software," ISPJ Magazine, vol. 40, No. 10, Japan, The Institute of Electronics, Information and Communication Engineers, Oct. 15, 1999, vol. 40 p. 1007-1010 [English Abstract Only].

Australian Patent Office Examination Report in Australian Patent Application Serial No. 2003230606 mailed on Apr. 3, 2008.

Australian Patent Office Examination Report No. 1 in Australian Patent Application Serial No. 2009203095 mailed on Oct. 12, 2010.

Australian Patent Office Examination Report No. 2 in Australian Patent Application Serial No. 2009203095 mailed on Feb. 2, 2012.

Australian Patent Office Examination Report No. 3 in Australian Patent Application Serial No. 200903095 mailed on Mar. 28, 2012.

Canadian Intellectual Property Office Examination Report in Canadian Patent Application Serial No. 2478299 mailed on Jul. 9, 2010.

European Supplementary Search Report for EP Application No. 03723691.6, dated Jun. 29, 2010, 6 pages.

European Patent Office Action for EP Application No. 03723691.6, dated Oct. 12, 2010, 6 pages.

European Patent Office Communication Pursuant to Article 94(3) EPC in EP Application Serial No. 03723691.3 mailed on Jan. 30, 2013.

European Patent Office Search Report and Opinion in EP Application Serial No. 12189404.2 mailed on Jan. 30, 2013.

European Patent Office Search Report and Opinion in EP Application Serial No. 12189407.5 mailed on Jan. 28, 2013.

European Patent Office Search Report and Opinion in EP Application Serial No. 12189412.5 mailed on Jan. 30, 2013.

European Patent Office Search Report and Opinion in EP Application Serial No. 12189413.3 mailed on Jan. 24, 2013.

PCT International Search Report in PCT International Application Serial No. PCT/US2003/007042 mailed on Nov. 13, 2003.

PCT International Preliminary Examination Report in PCT International Application Serial No. PCT/US2003/007042 mailed on Jan. 29, 2004.

Australian Patent Office Examination Report in Australian Patent Application Serial No. 2005304883 mailed on Apr. 16, 2010.

Canadian Patent Office Action in Canadian Patent Application Serial No. 2586709 mailed on Mar. 20, 2013.

China, State Intellectual Property Office, P.R. China, First Office Action in Chinese Patent Application Serial No. 20050046047 mailed on Mar. 1, 2010.

China, State Intellectual Property Office, P.R. China, Second Office Action in Chinese Patent Application Serial No. 20050046047 mailed on Dec. 7, 2010.

China, State Intellectual Property Office, P.R. China, Decision on Rejection in Chinese Patent Application Serial No. 20050046047 mailed on Jun. 27, 2011.

European Patent Office Supplementary Search Report and Written Opinion in EP Application Serial No. 05823134.1 mailed on Jun. 3, 2013.

Examiner's Report for Australian Patent Application Serial No. 2006315184 dated Mar. 31, 2010.

Canadian Office Action in Canadian Patent Application Serial No. 2,628,189 mailed on Dec. 8, 2011.

Canadian Office Action in Canadian Patent Application Serial No. 2,628,189 mailed on Jan. 31, 2013.

First Office Action for Chinese Patent Application Serial No. 200680050707.7 dated Mar. 9, 2010.

European Patent Office Search Report dated Nov. 26, 2010 and Written Opinion in EP Application Serial No. 06839820.May 2416 mailed on Dec. 3, 2010.

European Patent Office Communication Pursuant to Article 94(3) EPC 06839820.5-2416 mailed on Oct. 18, 2011 (including Annex EP Search Report dated Nov. 26, 2010).

PCT International Search Report and Written Opinion in PCT International Patent Application Serial No. PCT/US2006/060771 mailed on Feb. 12, 2008.

PCT International Preliminary Report on Patentability in PCT International Patent Application Serial No. PCT/US2006/060771 mailed on May 14, 2008.

Australian Patent Office First Examination Report and SIS in Australian Patent Application Serial No. 2008207924 mailed on Dec. 14, 2011.

State Intellectual Property Office, P.R. China First Office Action dated Nov. 9, 2011 in Chinese Patent Application Serial No. 200880009672.1.

State Intellectual Property Office, P.R. China Second Office Action dated Aug. 9, 2012 in Chinese Patent Application Serial No. 200880009672.1.

State Intellectual Property Office, P.R. China Third Office Action dated Nov. 9, 2012 in Chinese Patent Application Serial No. 200880009672.1.

European Patent Office Invitation Pursuant to Rule 62a(1) EPC mailed on Oct. 11, 2011.

PCT International Search Report in PCT International Application Serial No. PCT/US2008/051869 dated Jun. 4, 2008.

PCT International Preliminary Report on Patentability in PCT International Patent Application Serial No. PCT/US2008/051869 mailed on Jul. 28, 2009.

Australian Patent Office Patent Examination Report No. 1 issued in Australian Patent Application Serial No. 2008207930 on Dec. 9, 2011.

Australian Patent Office Examination Report No. 2 issued in Australian Patent Application Serial No. 2008207930 on Sep. 10, 2012.

China, State Intellectual Property Office, P.R. China, First Office Action in Chinese Patent Application Serial No. 200880009762.0 mailed on Sep. 14, 2011.

EPO Extended Search Report and Opinion in EP Application Serial No. 08728178.8 mailed on Aug. 2, 2012.

EPO Communication Pursuant to Article 94(3) EPC in EP Application Serial No. 08847431.7-2416 mailed on Dec. 11, 2012.

EPO Supplementary European Search Report in EP Application Serial No. 08847431.7-2416 mailed on Dec. 3, 2012.

PCT International Search Report and Written Opinion in PCT Application Serial No. PCT/US2008/082771, mailed on Aug. 24, 2009.

PCT International Preliminary Report on Patentability in PCT Application Serial No. PCT/US2008/082771, mailed on May 11, 2010.

Australian Patent Office Examination Report No. 1 issued in Australian Patent Application Serial No. 2008323784 issue on Jul. 13, 2012.
PCT International Search Report and Written Opinion in PCT Application Serial No. PCT/2008/082781 mailed on Aug. 7, 2009.
International Preliminary Report on Patentability in PCT International Application Serial No. PCT/US2008/082781 mailed on May 11, 2010.
Australian Patent Office First Examination Report in Australian Patent Application Serial No. 2009251584 dated Feb. 7, 2013.
China Patent Office First Office Action in Chinese Patent Application Serial No. 200980120009.3 mailed on Mar. 26, 2013.
EP Supplementary European Search Report in EP Application Serial No. 09755480.2-2416 mailed on Dec. 3, 2012.
EPO Communication Pursuant to Article 94(3) EPC (Supplementary Search Report) in EP Application Serial No. 09755480.2-2416 mailed on Dec. 11, 2012.

* cited by examiner

FIG. 3

| | $P_{NR}$ (PROBABILITY OF NON-REPUTABLE SENDER) | | | | | | | | | | |
|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 |
| $P_R$ (PROBABILITY OF REPUTABLE SENDER) | 0.0 | 0 | 3 | 5 | 6 | 5 | 4 | 4 | 10 | 27 | 65 | 140 |
| | 0.1 | -3 | 0 | 2 | 3 | 3 | 3 | 5 | 12 | 28 | 62 | 126 |
| | 0.2 | -5 | -2 | 0 | 1 | 2 | 3 | 5 | 11 | 24 | 53 | 106 |
| | 0.3 | -6 | -3 | -1 | 0 | 1 | 2 | 4 | 9 | 20 | 43 | 85 |
| | 0.4 | -5 | -3 | -2 | -1 | 0 | 1 | 3 | 7 | 16 | 33 | 66 |
| | 0.5 | -4 | -3 | -3 | -2 | -1 | 0 | 2 | 5 | 12 | 25 | 50 |
| | 0.6 | -4 | -5 | -5 | -4 | -3 | -2 | 0 | 3 | 8 | 18 | 37 |
| | 0.7 | -10 | -12 | -11 | -9 | -7 | -5 | -3 | 0 | 5 | 13 | 27 |
| | 0.8 | -27 | -28 | -24 | -20 | -16 | -12 | -8 | -5 | 0 | 7 | 18 |
| | 0.9 | -65 | -62 | -53 | -43 | -33 | -25 | -18 | -13 | -7 | 0 | 10 |
| | 1.0 | -140 | -126 | -106 | -85 | -66 | -50 | -37 | -27 | -18 | -10 | 0 |

SYSTEMS AND METHODS FOR CLASSIFICATION OF MESSAGING ENTITIES

CROSS-REFERENCE TO RELATED APPLICATIONS

This application is a continuation application of, and claims priority to, pending U.S. patent application Ser. No. 11/142,943, entitled "Systems and Methods for Classification of Messaging Entities," which was filed on Jun. 2, 2005; which application claims priority to and the benefit of U.S. Provisional Application Ser. No. 60/625,507 (entitled "Classification of Messaging Entities") filed on Nov. 5, 2004.

U.S. patent application Ser. No. 11/142,943, entitled "Systems and Methods for Classification of Messaging Entities," which was filed on Jun. 2, 2005 is a continuation-in-part of, and claims priority to and the benefit of U.S. patent application Ser. No. 10/093,553 (now U.S. Pat. No. 6,941,467), entitled "SYSTEMS AND METHODS FOR ADAPTIVE MESSAGE INTERROGATION THROUGH MULTIPLE QUEUES;" U.S. patent application Ser. No. 10/094,211 (now U.S. Pat. No. 7,458,098), entitled "SYSTEMS AND METHODS FOR ENHANCING ELECTRONIC COMMUNICATION SECURITY;" and U.S. patent application Ser. No. 10/094,266 (now U.S. Pat. No. 7,124,438), entitled "SYSTEMS AND METHODS FOR ANOMALY DETECTION IN PATTERNS OF MONITORED COMMUNICATIONS," all filed on Mar. 8, 2002.

U.S. patent application Ser. No. 11/142,943, entitled "Systems and Methods for Classification of Messaging Entities," which was filed on Jun. 2, 2005 is also a continuation-in-part of, and claims priority to and the benefit of U.S. patent application Ser. No. 10/361,091 (now U.S. Pat. No. 7,096,498), filed Feb. 7, 2003, entitled "SYSTEMS AND METHODS FOR MESSAGE THREAT MANAGEMENT;" U.S. patent application Ser. No. 10/373,325 (now U.S. Pat. No. 7,213,260), filed Feb. 24, 2003, entitled "SYSTEMS AND METHODS FOR UPSTREAM THREAT PUSHBACK;" U.S. patent application Ser. No. 10/361,067 (now abandoned), filed Feb. 7, 2003, entitled "SYSTEMS AND METHODS FOR AUTOMATED WHITELISTING IN MONITORED COMMUNICATIONS;" and U.S. patent application Ser. No. 10/384,924 (now U.S. Pat. No. 7,694,128), filed Mar. 6, 2003, entitled "SYSTEMS AND METHODS FOR SECURE COMMUNICATION DELIVERY." The disclosures of the foregoing applications and patents are incorporated herein by reference in their entirety.

BACKGROUND AND SUMMARY

This document relates generally to systems and methods for processing communications and more particularly to systems and methods for filtering communications.

In the anti-spam industry, spammers use various creative means for evading detection by spam filters. Accordingly, spam filter designers adopt a strategy of combining various detection techniques in their filters.

Current tools for message sender analysis include IP blacklists (sometimes called real-time blacklists (RBLs)) and IP whitelists (real-time whitelists (RWLs)). Whitelists and blacklists certainly add value to the spam classification process; however, whitelists and blacklists are inherently limited to providing a binary-type (YES/NO) response to each query. In contrast, a reputation system has the ability to express an opinion of a sender in terms of a scalar number in some defined range. Thus, where blacklists and whitelists are limited to "black and white" responses, a reputation system can express "shades of gray" in its response.

In accordance with the teachings disclosed herein, methods and systems are provided for operation upon one or more data processors for assigning a reputation to a messaging entity. A method can include receiving data that identifies one or more characteristics related to a messaging entity's communication. A reputation score is determined based upon the received identification data. The determined reputation score is indicative of reputation of the messaging entity. The determined reputation score is used in deciding what action is to be taken with respect to a communication associated with the messaging entity.

BRIEF DESCRIPTION OF THE DRAWINGS

FIG. 3 is a table depicting reputation scores at various calculated probability values.

DETAILED DESCRIPTION

Figure 1:
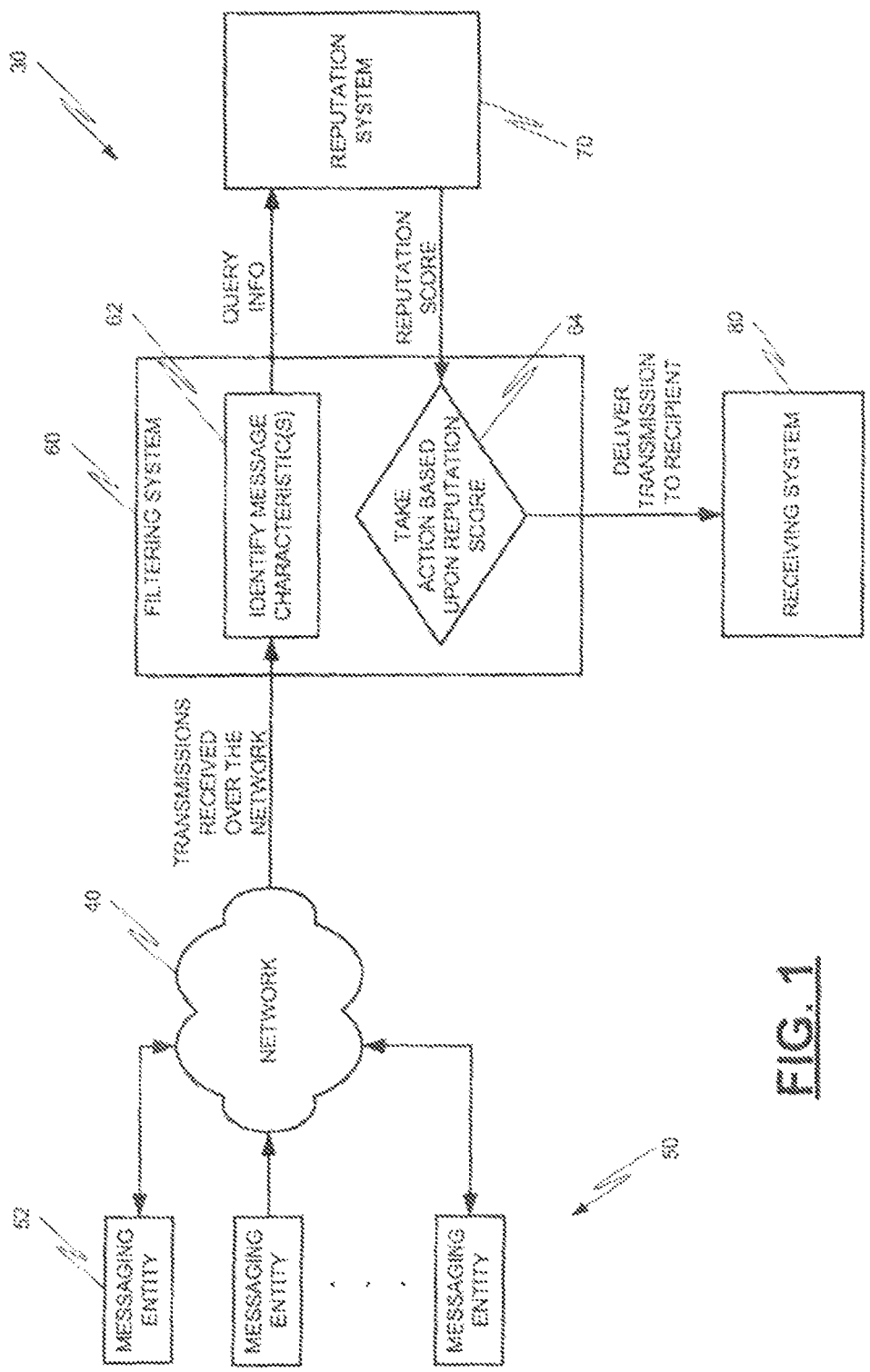
FIG. 1 is a block diagram depicting a system for handling transmissions received over a network.

FIG. 1 depicts at 30 a system for handling transmissions received over a network 40. The transmissions can be many different types of communications, such as electronic mail (e-mail) messages sent from one or more messaging entities 50. The system 30 assigns a classification to a messaging entity (e.g., messaging entity 52), and based upon the classification assigned to the messaging entity, an action is taken with respect to the messaging entity's communication.

The system 30 uses a filtering system 60 and a reputation system 70 to help process communications from the messaging entities 50. The filtering system 60 uses the reputation system 70 to help determine what filtering action (if any) should be taken upon the messaging entities' communications. For example, the communication may be determined to be from a reputable source and thus the communication should not be filtered.

The filtering system 60 identifies at 62 one or more message characteristics associated with a received communication and provides that identification information to the reputation system 70. The reputation system 70 evaluates the reputation by calculating probabilities that the identified message characteristic(s) exhibit certain qualities. An overall reputation score is determined based upon the calculated probabilities and is provided to the filtering system 60.

The filtering system 60 examines at 64 the reputation score in order to determine what action should be taken for the sender's communication (such as whether the communication transmission should be delivered to the communication's designated recipient located within a message receiving system 80). The filtering system 60 could decide that a communication should be handled differently based in whole or in part upon the reputation scored that was provided by the reputation system 70. As an illustration, a communication may be determined to be from a non-reputable sender and thus the communication should be handled as Spain (e.g., deleted, quarantined, etc.).

Figure 2:
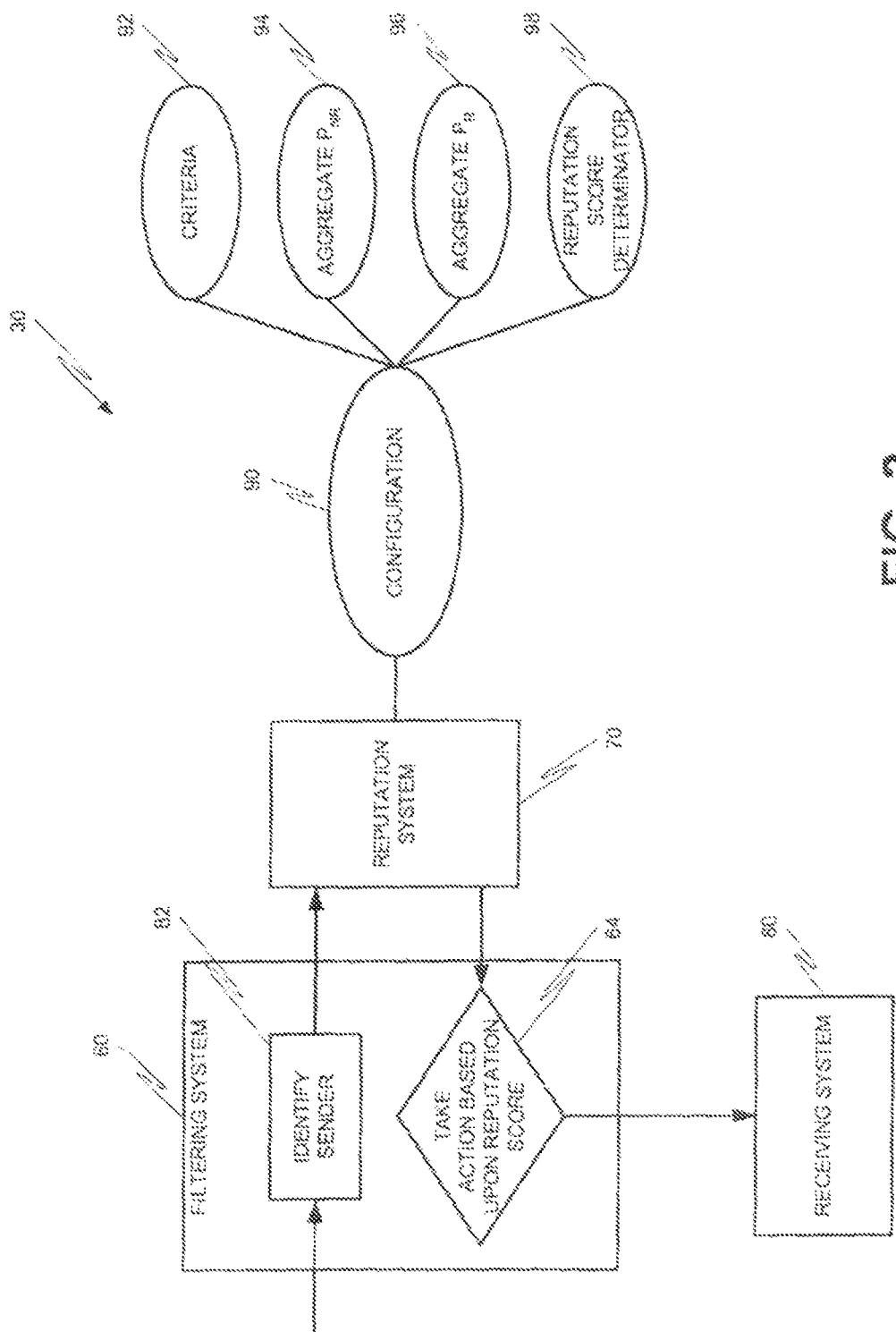
FIG. 2 is a block diagram depicting a reputation system that has been configured for determining reputation scores.

Reputation systems may be configured in many different ways in order to assist a filtering system. For example, a reputation system 70 can be located externally or internally relative to the filtering system 60 depending upon the situation at hand. As another example, FIG. 2 depicts a reputation system 70 that has been configured to calculate reputation scores based upon such message characteristic identification information as sender identity as shown at 82. It should be understood that other message characteristics can be used instead of or in addition to sender identity. Moreover, transmissions may be from many different types of messaging entities, such as a domain name, IP address, phone number, or individual electronic address or username representing an organization, computer, or individual user that transmits electronic messages. For example, generated classifications of reputable and non-reputable can be based upon a tendency for an IP address to send unwanted transmissions or legitimate communication.

The system's configuration 90 could also, as shown in FIG. 2, be established by identifying a set of binary, testable criteria 92 which appear to be strong discriminators between good and bad senders. $P(NR|C_i)$ can be defined as the probability that a sender is non-reputable, given that it conforms to quality/criterion $C_i$, and $P(R|C_i)$ can be defined as the probability that a sender is reputable, given that it conforms to quality/criterion $C_i$.

For each quality/criterion $C_i$, periodic (e.g., daily, weekly, monthly, etc.) sampling exercises can be performed to recalculate $P(NR|C_i)$. A sampling exercise may include selecting a random sample set S of N senders for which quality/criterion $C_i$ is known to be true. The senders in the sample are then sorted into one of the following sets: reputable (R), non-reputable (NR) or unknown (U). $N_R$ is the number of senders in the sample that are reputable senders, $N_{NR}$ is the number of senders that are non-reputable senders, etc. Then, $P(NR|C_i)$ and $P(R|C_i)$ are estimated using the formulas:

$$P(NR|C_i) = \frac{N_{NR}}{N}$$

$$P(R|C_i) = \frac{N_R}{N}$$

For this purpose, N=30 was determined to be a large enough sample size to achieve an accurate estimate of $P(NR|C_i)$ and $P(R|C_i)$ for each quality/criterion $C_i$.

After calculating $P(NR|C_i)$ and $P(R|C_i)$ for all criteria, the computed probabilities are used to calculate an aggregate non-reputable probability 94, $P_{NR}$, and an aggregate reputable sender probability 96, $P_R$, for each sender in the reputation space. These probabilities can be calculated using the formulas:

$$P_{NR} = \left(1 - \prod_{i=1}^{N}\left\{\begin{array}{ll}1 - P(NR|C_i) & \text{if criterion } i \text{ applies} \\ 1 & \text{otherwise}\end{array}\right.\right)^{(\#of\ criteria\ that\ apply)}$$

$$P_R = \left(1 - \prod_{i=1}^{N}\left\{\begin{array}{ll}1 - P(R|C_i) & \text{if criterion } i \text{ applies} \\ 1 & \text{otherwise}\end{array}\right.\right)^{(\#of\ criteria\ that\ apply)}$$

In experimentation, the above formulas appeared to behave very well for a wide range of input criteria combinations, and in practice their behavior appears to be similar to the behavior of the formula for correctly computing naïve joint conditional probabilities of "non-reputable" and "reputable" behavior for the input criteria.

After calculating $P_{NR}$ and $P_R$ for each sender, a reputation score is calculated for that sender using the following reputation function:

$$f(P_{NR}, P_R) = (c_1 + c_2 P_{NR} + c_2 P_R + c_3 P_{NR}^2 + c_3 P_R^2 + c_4 P_{NR} P_R + c_5 P_{NR}^3 + c_5 P_R^3 + c_6 P_{NR} P_R^2 + c_6 P_{NR}^2 P_R)$$
$$((P_{NR} - P_R)^3 + c_7(P_{NR} - P_R))$$

where
$c_1$=86.50
$c_2$=−193.45
$c_3$=−35.19
$c_4$=581.09
$C_5$=234.81
$c_6$=−233.18
$c_7$=0.51

It should be understood that different functions can act as a reputation score determinator 98 and can be expressed in many different forms in addition to a functional expression. As an illustration, FIG. 3 depicts at 100 a tabular form for determining reputation scores. The table shows reputation scores produced by the above function, based on values of $P_{NR}$ and $P_R$ as they each vary between 0.0 and 1.0. For example as shown at 110, a reputation score of 53 is obtained for the combination of $P_{NR}$=0.9 and $P_R$=0.2. This reputation score is a relatively high indicator that the sender should not be considered reputable. A reputation score of 0 is obtained if $P_{NR}$ and $P_R$ are the same (e.g., the reputation score is 0 if $P_{NR}$=0.7 and $P_R$=0.7 as shown at 120). A reputation score can have a negative value to indicate that a sender is relatively reputable as determined when $P_R$ is greater than $P_{NR}$. For example, if $P_{NR}$=0.5 and $P_R$=0.8 as shown at 130, then the reputation score is −12.

Figure 4:
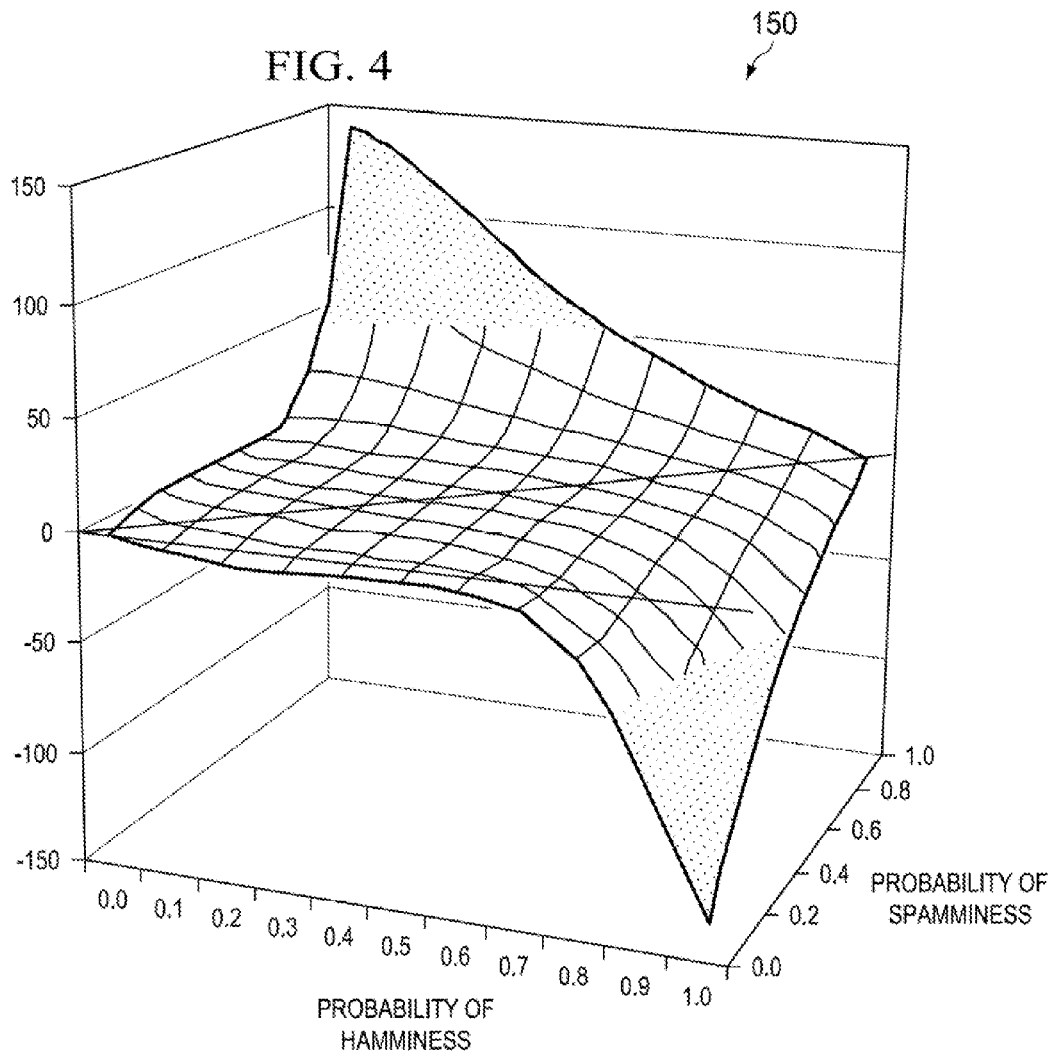
FIG. 4 is a graph depicting reputation scores at various calculated probability values.

Reputation scores can be shown graphically as depicted in FIG. 4 at 150. Graph 150 was produced by the above function, based on values of $P_{NR}$ and $P_R$. FIG. 4 illustrates reputation score determinations in the context of Spam in that the terms $P_{NR}$ and $P_R$ are used respectively as probability of hamminess and probability of spamminess as the probabilities each vary between 0.0 and 1.0.

As shown in these examples, reputation scores can be numeric reputations that are assigned to messaging entities based on characteristics of a communication (e.g., messaging entity characteristic(s)) and/or a messaging entity's behavior. Numeric reputations can fluctuate between a continuous spectrum of reputable and non-reputable classifications. However, reputations may be non-numeric, such as by having textual, or multiple level textual categories.

Figure 5:
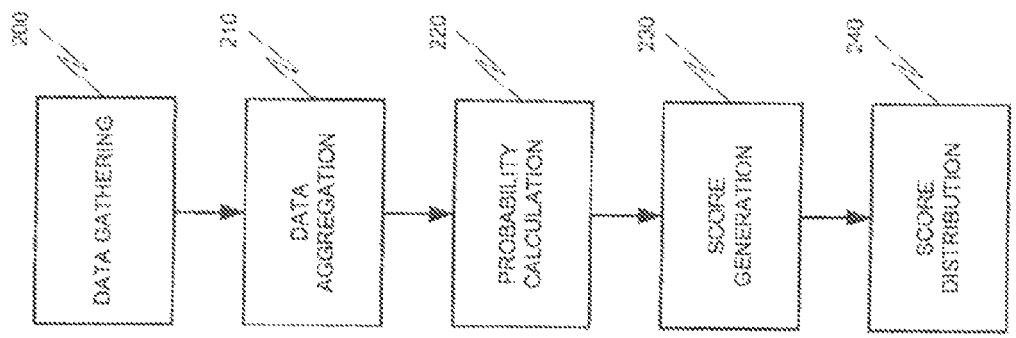
FIG. 5 is a flowchart depicting an operational scenario for generating reputation scores.

FIG. 5 depicts an operational scenario wherein a reputation system is used by a filtering system to generate reputation scores. In this operational scenario, a reputation score is computed for a particular sender (e.g., IP address, domain name, phone number, address, name, etc), from a set of input data. With reference to FIG. 5, data is gathered at step 200 that is needed to calculate non-reputable and reputable probabilities for a sender. The data is then aggregated at step 210 and used in probability calculations at step 220. This includes determining, for a sender, non-reputable probabilities and reputable probabilities for various selected criteria. An aggregate non-reputable probability and an aggregate reputable probability are then calculated for each sender.

After calculating an aggregate non-reputable probability and an aggregate reputable probability for each sender, a reputation score is calculated at 230 for that sender using a reputation function. At step 240, the sender's reputation score is distributed locally and/or to one or more systems to evaluate a communication associated with the sender. As an illustration, reputation scores can be distributed to a filtering system. With the reputation score, the filtering system can choose to take an action on the transmission based on the range the sender reputation score falls into. For unreputable senders, a filtering system can choose to drop the transmission (e.g., silently), save it in a quarantine area, or flag the transmission as suspicious. In addition, a filter system can choose to apply such actions to all future transmissions from this sender for a specified period of time, without requiring new lookup queries to be made to the reputation system. For reputable senders, a filtering system can similarly apply actions to the transmissions to allow them to bypass all or certain filtering techniques that cause significant processing, network, or storage overhead for the filtering system.

It should be understood that similar to the other processing flows described herein, the processing and the order of the processing may be altered, modified and/or augmented and still achieve the desired outcome. For example, an optional addition to the step of extracting unique identifying information about the sender of the transmission would be to use sender authentication techniques to authenticate certain parts of the transmission, such as the purported sending domain name in the header of the message, to unforgeable information about the sender, such as the IP address the transmission originated from. This process can allow the filtering system to perform lookups on the reputation system by querying for information that can potentially be forged, had it not been authenticated, such as a domain name or email address. If such domain or address has a positive reputation, the transmission can be delivered directly to the recipient system bypassing all or some filtering techniques. If it has a negative reputation, the filtering system can choose to drop the transmission, save it in a quarantine area, or flag it as suspicious.

Many different types of sender authentication techniques can be used, such as the Sender Policy Framework (SPF) technique. SPF is a protocol by which domain owners publish DNS records that indicate which IP addresses are allowed to send mail on behalf of a given domain. As other non-limiting examples, SenderID or DomainKeys can be used as sender authentication techniques.

Figure 6:
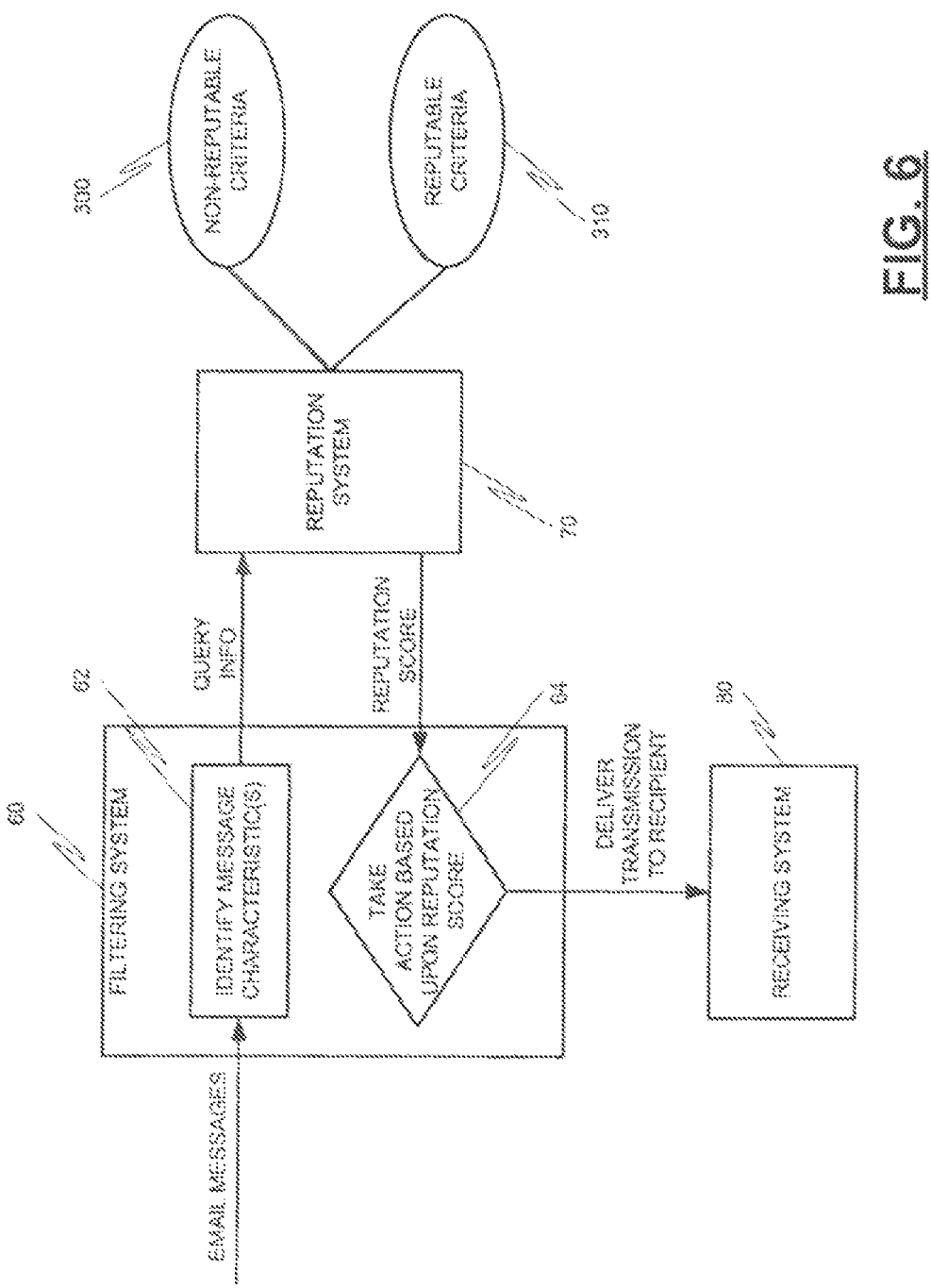
FIG. 6 is a block diagram depicting use of non-reputable criteria and reputable criteria for determining reputation scores.

As another example, many different types of criteria may be used in processing a sender's communication. FIG. 6 depicts the use of non-reputable criteria 300 and reputable criteria 310 for use in determining reputation scores.

The non-reputable criteria 300 and reputable criteria 310 help to distinguish non-reputable senders and reputable senders. A set of criteria can change often without significantly affecting the reputation scores produced using this scoring technique. As an illustration within the context of SPAM identification, the following is a list of spamminess criteria that could be used in the reputation scoring of a message sender. The list is not intended to be exhaustive, and can be adapted to include other criteria or remove criteria based upon observed behavior.

1. Mean Spam Score: A sender is declared "non-reputable" if a mean spam profiler score of transmissions that it sends exceeds some threshold, W.
2. RDNS Lookup Failure: A sender is declared "non-reputable" if reverse domain name system (RDNS) queries for its IP addresses fail.
3. RBL Membership: A sender is declared "non-reputable" if it is included in a real-time blackhole list (RBL). (Note: multiple RBLs may be used. Each RBL can constitute a separate testing criterion.)
4. Mail Volume: A sender is declared "non-reputable" if its average (mean or median) transmission volume exceeds a threshold, X, where X is measured in transmissions over a period of time (such as, e.g., a day, week, or month). (Note: multiple average volumes over multiple time periods may be used, and each average volume can constitute a separate testing criterion.)
5. Mail Burstiness/Sending History: A sender is declared "non-reputable" if its average (mean or median) transmission traffic pattern burstiness (defined by the number of active sending sub-periods within a larger time period, e.g., number of active sending hours in a day or number of active sending days in a month) is less than some threshold, Y, where Y is measured in sub-periods per period. (Note: multiple average burstiness measures over multiple time periods may be used, and each average burstiness measure can constitute a separate testing criterion.)
6. Mail Breadth: A sender is declared "non-reputable" if its average (mean or median) transmission traffic breadth (as defined by the percentage of systems that receive transmissions from the same sender during a period of time (such as, e.g., a day, week, or month)) exceeds some threshold, Z. (Note: multiple average breadths over multiple time periods may be used, and each average breadth measure can constitute a separate testing criterion.)
7. Malware Activity: A sender is declared "non-reputable" if it is known to have delivered one or more malware codes (such as, e.g., viruses, spyware, intrusion code, etc) during a measurement period (e.g., a day, week, or month).
8. Type of Address: A sender is declared "non-reputable" if it is known to be dynamically assigned to dial-up or broadband dynamic host control protocol (DHCP) clients by an internet service provider (ISP).
9. CIDR Block Spamminess: A sender is declared "non-reputable" if its IP addresses are known to exist within classless inter-domain routing (CIDR) blocks that contain predominantly "non-reputable" IP addresses.
10. Human Feedback: A sender is declared "non-reputable" if it is reported to have sent undesirable transmissions by people analyzing the content and other characteristics of those transmissions.
11. Spain Trap Feedback: A sender is declared "non-reputable" if it is sending transmissions to accounts that have been declared as spamtraps and as such are not supposed to receive any legitimate transmissions.
12. Bounceback Feedback: A sender is declared "non-reputable" if it is sending bounceback transmissions or transmissions to accounts that do not exist on the destination system.
13. Legislation/Standards Conformance: A sender is declared "non-reputable" if it is not conforming to laws, regulations, and well-established standards of transmission behavior in the countries of operation of either the sender and/or the recipient of the transmissions.

14. Continuity of Operation: A sender is declared "non-reputable" if it has not operated at that sending location longer than some threshold Z.
15. Responsiveness to Recipient Demands: A sender is declared "non-reputable" if it is not responding in a reasonable timeframe to legitimate demands of the recipients to terminate their relationship with the sender to not receive any more transmissions from them.

The following is a list of "reputable" criteria that could be used in determining the "reputability" of a sender. The list is not intended to be exhaustive, and can be adapted to include other criteria or remove criteria based upon observed behavior.

1. Mean Spam Score: A sender is declared "reputable" if the mean spam profiler score of transmissions that it sends falls below some threshold, W.
2. Human Feedback: A sender is declared "reputable" if it is reported to have sent only legitimate transmissions by people analyzing transmission flows from that sender, in conjunction with the reputation of the organization that owns those sending stations.

Figure 7:
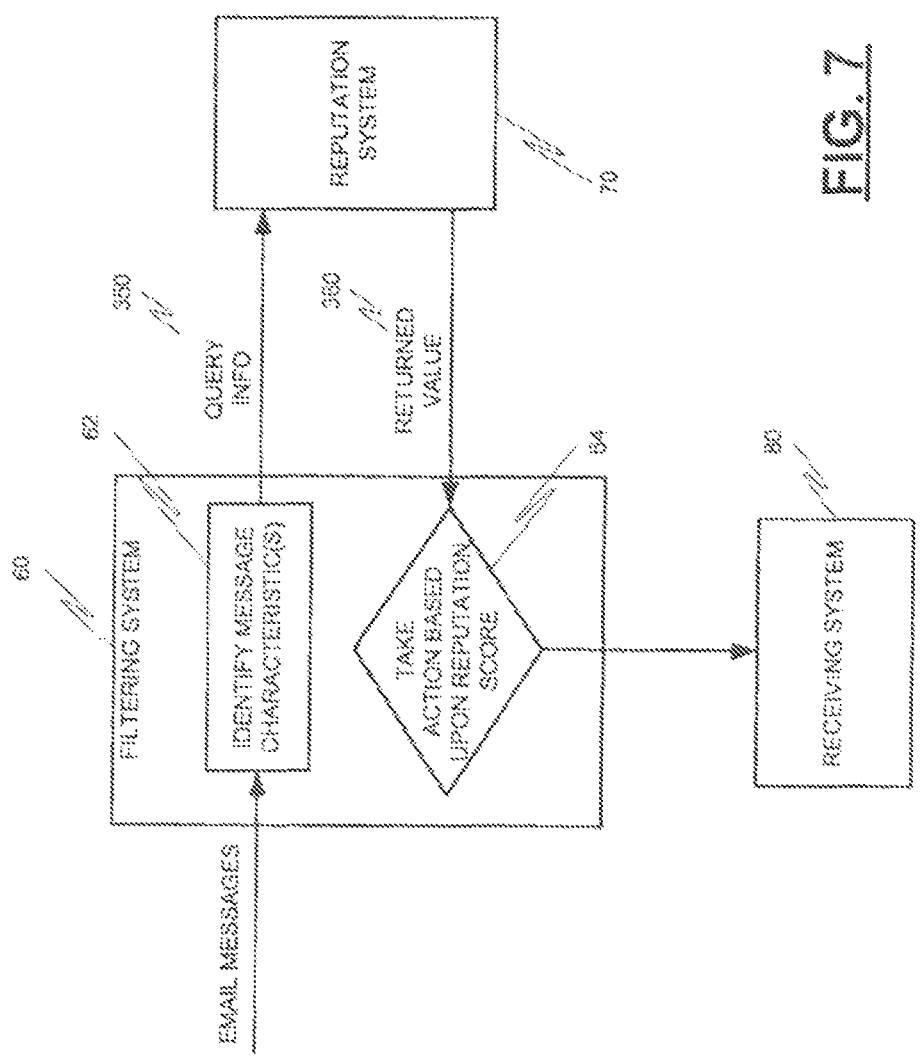
FIG. 7 is a block diagram depicting a reputation system configured to respond with a return value that includes the reputation score of a sender.

After computing a reputation grade for each sender in the universe of senders, a reputation classification can be made available via a communication protocol that can be interpreted by the queriers that make use of the reputation system (e.g., DNS, HTTP, etc). As shown in FIG. 7, when a query 350 is issued for a sender, the reputation system can respond with a return value 360 that includes the reputation score of that sender, as well as any other relevant additional information that can be used by the querier to make the final judgment on the acceptability of the sender's transmission (e.g., age of the reputation score, input data that determined the score, etc).

An example of a communication protocol that can be used is a domain name system (DNS) server which can respond with a return value in the form of an IP address: 172.x.y.z. The IP address can be encoded using the formula:

$$IP = 172 \cdot \left(\frac{rep - |rep|}{2 \times rep}\right) \cdot (|rep|div256) \cdot (|rep|mod256)$$

The reputation of the queried sender can be deciphered from the return value as follows:

$$rep = (-1)^{2-x} \times (256y + z)$$

Therefore, when x=0, the returned reputation is a positive number, and when x=1, the returned reputation is a negative number. The absolute value of the reputation is determined by the values of y and z. This encoding scheme enables the server to return via the DNS protocol reputation values within the range [−65535, 65535]. It also leaves seven (7) unused bits, namely the seven high-order bits of x. These bits can be reserved for extensions to the reputation system. (For example, the age of a reputation score may be communicated back to the querier.)

Figure 8:
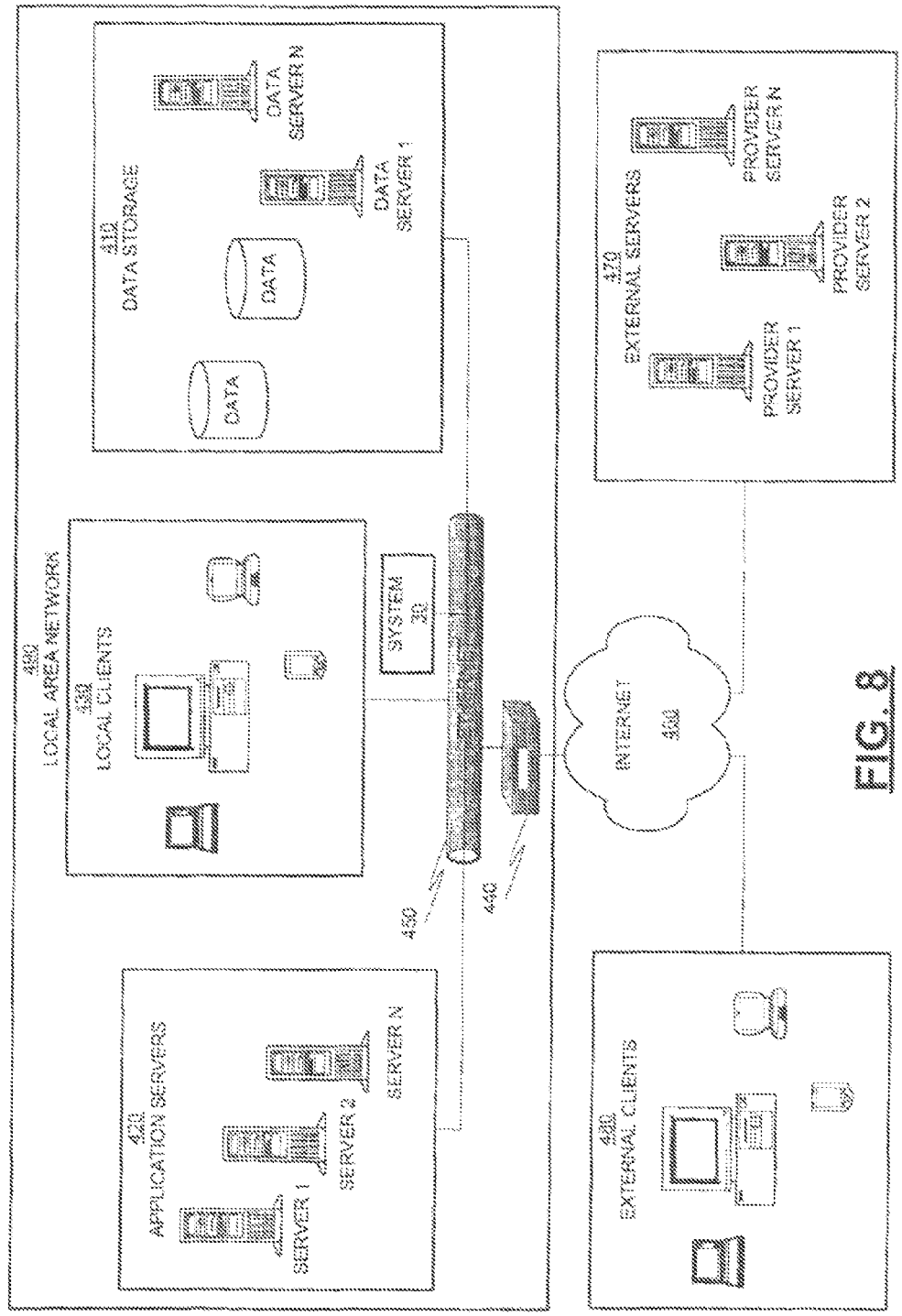
FIG. 8 is a block diagram depicting a server access architecture.

The systems and methods disclosed herein may be implemented on various types of computer architectures, such as for example on different types of networked environments. As an illustration, FIG. 8 depicts a server access architecture within which the disclosed systems and methods may be used (e.g., as shown at 30 in FIG. 8). The architecture in this example includes a corporation's local network 490 and a variety of computer systems residing within the local network 490. These systems can include application servers 420 such as Web servers and e-mail servers, user workstations running local clients 430 such as e-mail readers and Web browsers, and data storage devices 410 such as databases and network connected disks. These systems communicate with each other via a local communication network such as Ethernet 450. Firewall system 440 resides between the local communication network and Internet 460. Connected to the Internet 460 are a host of external servers 470 and external clients 480.

Local clients 430 can access application servers 420 and shared data storage 410 via the local communication network. External clients 480 can access external application servers 470 via the Internet 460. In instances where a local server 420 or a local client 430 requires access to an external server 470 or where an external client 480 or an external server 470 requires access to a local server 420, electronic communications in the appropriate protocol for a given application server flow through "always open" ports of firewall system 440.

A system 30 as disclosed herein may be located in a hardware device or on one or more servers connected to the local communication network such as Ethernet 480 and logically interposed between the firewall system 440 and the local servers 420 and clients 430. Application-related electronic communications attempting to enter or leave the local communications network through the firewall system 440 are routed to the system 30.

In the example of FIG. 8, system 30 could be configured to store and process reputation data about many millions of senders as part of a threat management system. This would allow the threat management system to make better informed decisions about allowing or blocking electronic mail (e-mail).

System 30 could be used to handle many different types of e-mail and its variety of protocols that are used for e-mail transmission, delivery and processing including SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent. In addition, the IMAP protocol has evolved as an alternative to POP3 that supports more advanced interactions between e-mail servers and clients. This protocol is described in RFC 2060.

Other communication mechanisms are also widely used over networks. These communication mechanisms include, but are not limited to, Voice Over IP (VoIP) and Instant Messaging. VoIP is used in IP telephony to provide a set of facilities for managing the delivery of voice information using the Internet Protocol (IP). Instant Messaging is a type of communication involving a client which hooks up to an instant messaging service that delivers communications (e.g., conversations) in realtime.

As the Internet has become more widely used, it has also created new troubles for users. In particular, the amount of spam received by individual users has increased dramatically in the recent past. Spam, as used in this specification, refers to any communication receipt of which is either unsolicited or not desired by its recipient. A system and method can be configured as disclosed herein to address these types of unsolicited or undesired communications. This can be helpful in that e-mail spamming consumes corporate resources and impacts productivity.

The systems and methods disclosed herein are presented only by way of example and are not meant to limit the scope of the invention. Other variations of the systems and methods described above will be apparent to those skilled in the art and as such are considered to be within the scope of the invention. For example, using the systems and methods of sender classification described herein, a reputation system can be configured for use in training and tuning of external filtering techniques. Such techniques may include Bayesian, Support Vector Machine (SVM) and other statistical content filtering techniques, as well as signature-based techniques such as distributed bulk message identification and message clustering-type techniques. The training strategies for such techniques can require sets of classified legitimate and unwanted transmissions, which can be provided to the trainer by classifying streams of transmissions based on the reputation scores of their senders. Transmissions from senders classified as un-reputable can be provided to the filtering system trainer as unwanted, and the wanted transmissions can be taken from the stream sent by the legitimate senders.

As an illustration, methods and systems can be configured to perform tuning and training of filtering systems utilizing reputation scores of senders of transmissions in sets of trainable transmissions. At least one characteristic is identified about transmissions from senders. The identifying of at least one characteristic can include extracting unique identifying information about the transmissions (e.g., information about the senders of the transmissions), or authenticating unique identifying information about the transmissions, or combinations thereof. Queries are sent to a reputation system and scores are received representing reputations of the senders. Transmissions are classified into multiple categories based on a range a sender's reputation score falls into. Transmissions and their classification categories are passed on to a trainer of another filtering system to be used for optimization of the filtering system.

As another example, methods and systems can be configured to perform filtering of groups of transmissions utilizing reputation scores of senders of transmissions. Multiple transmissions can be grouped together based on content similarities or similarities in transmission sender behavior. At least one characteristic can be identified about each transmission in the groupings. The identifying of at least one characteristic can include extracting unique identifying information about the transmission (e.g., information about the sender of a transmission), or authenticating unique identifying information about the transmission, or combinations thereof. A query can be sent to the reputation system and receive a score representing reputation of each sender. Groups of transmissions can be classified based on the percentage of reputable and non-reputable senders in the group.

As another example of the wide variations of the disclosed systems and methods, different techniques can be used for computation of joint conditional probabilities. More specifically, different mathematical techniques can be used for computing the aggregate non-reputable sender probability, $P_{NR}$, and the aggregate reputable sender probability, $P_R$, for each sender in the reputation space. As an illustration, two techniques are described. Both techniques use P (NR|$C_i$) and P (R|$C_i$), the conditional probabilities of non-reputable and reputable behavior, for each testing criterion $C_i$. The first technique makes the assumption that all testing criteria are independent. The second technique incorporates the assumption that the testing criteria are not independent. Therefore, the second technique is more difficult to carry out, but produces more accurate results.

1. Technique for Independent Testing Criteria

In the independent case, it is assumed that each criterion $C_i$ is independent of all other criteria. The probability that the sender is non-reputable, $P_{NR}$, is calculated using the following formula:

$$P_{NR} = \frac{\prod P(NR \mid C_j)}{\prod P(NR \mid C_j) + \prod (1 - P(NR \mid C_j))}$$

where j ranges over all criteria that apply to the sender in question. Similarly, the probability that the sender is a reputable sender, $P_R$, is calculated using the following formula:

$$P_R = \frac{\prod P(R \mid C_j)}{\prod P(R \mid C_j) + \prod (1 - P(R \mid C_j))}$$

where j ranges over all criteria that apply to the sender in question.

2. Technique for Non-Independent Testing Criteria

In the dependent case, it is assumed that each criterion $C_i$ is not independent of all other criteria, so the analysis must take into account "non-linear" interactions between criteria within their joint probability distribution. To find the correct values for $P_{NR}$ and $P_R$ for a given sender, a table is constructed to represent the entire joint probability distribution. Below is a sample table for a joint distribution of four qualities/criteria.

| Case | $C_1$ | $C_2$ | $C_3$ | $C_4$ | $P_{NR}$ | $P_R$ |
|---|---|---|---|---|---|---|
| 1 | N | N | N | N | N/A | N/A |
| 2 | N | N | N | Y | P(NR|$C_4$) | P(R|$C_4$) |
| 3 | N | N | Y | N | P(NR|$C_3$) | P(R|$C_3$) |
| 4 | N | N | Y | Y | P(NR|$C_3$, $C_4$) | P(R|$C_3$, $C_4$) |
| 5 | N | Y | N | N | P(NR|$C_2$) | P(R|$C_2$) |
| 6 | N | Y | N | Y | P(NR|$C_2$, $C_4$) | P(R|$C_2$, $C_4$) |
| 7 | N | Y | Y | N | P(NR|$C_2$, $C_3$) | P(R|$C_2$, $C_3$) |
| 8 | N | Y | Y | Y | P(NR|$C_2$, $C_3$, $C_4$) | P(R|$C_2$, $C_3$, $C_4$) |
| 9 | Y | N | N | N | P(NR|$C_1$) | P(R|$C_1$) |
| 10 | Y | N | N | Y | P(NR|$C_1$, $C_4$) | P(R|$C_1$, $C_4$) |
| 11 | Y | N | Y | N | P(NR|$C_1$, $C_3$) | P(R|$C_1$, $C_3$) |
| 12 | Y | N | Y | Y | P(NR|$C_1$, $C_3$, $C_4$) | P(R|$C_1$, $C_3$, $C_4$) |
| 13 | Y | Y | N | N | P(NR$C_1$, $C_2$) | P(R|$C_1$, $C_2$) |
| 14 | Y | Y | N | Y | P(NR|$C_1$, $C_2$, $C_4$) | P(R|$C_1$, $C_2$, $C_4$) |
| 15 | Y | Y | Y | N | P(NR|$C_1$, $C_2$, $C_3$) | P(R|$C_1$, $C_2$, $C_3$) |
| 16 | Y | Y | Y | Y | P(NR|$C_1$, $C_2$, $C_3$, $C_4$) | P(R|$C_1$, $C_2$, $C_3$, $C_4$) |

For a joint distribution of M criteria, there exist ($2^M-1$) distinct cases within the joint probability distribution. Each case constitutes a particular combination of characteristics. The probability that the sender is non-reputable, $P_{NR}$, is estimated for each case using the following technique. For each one of the ($2^M-1$) cases, a random sample of N senders is gathered that exhibit the combination of characteristics described by that case. (For this purposes, N=30 is a large enough sample). Each sender is sorted into one of the following sets: reputable (R), non-reputable (NR) or unknown (U). $N_R$ is the number of sender in the sample that are reputable senders, $N_{NR}$ is the number of senders that are non-reputable senders, etc. Then, $P_{NR}$ and $P_R$ is estimated using the formulas:

$$P_{NR} = \frac{N_{NR}}{N}$$

$$P_R = \frac{N_R}{N}$$

The sampling of the IP addresses is repeated periodically (e.g., daily, weekly, monthly) to update the joint probability distribution.

It is further noted that the systems and methods disclosed herein may use articles of manufacture having data/digital signals conveyed via networks (e.g., local area network, wide area network, internet, etc.), fiber optic medium, carrier waves, wireless networks, etc. for communication with one or more data processing devices. The data/digital signals can carry any or all of the data disclosed herein that is provided to or from a device.

Additionally, the methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A method for operation upon one or more data processors to assign a reputation to a messaging entity, comprising:
   receiving data that identifies one or more characteristics related to a messaging entity's communication;
   for each criterion in a set of criteria for use in discriminating between reputable and non-reputable classifications:
      determining, by one or more data processors, whether the criterion applies to the messaging entity;
      determining, by the one or more data processors, a first conditional probability that the messaging entity is a non-reputable messaging entity in response to determining that the criterion applies to the messaging entity; and
      determining, by the one or more data processors, a second conditional probability that the messaging entity is a reputable messaging entity in response to determining that the criterion applies to the messaging entity;
   determining, by the one or more data processors, a first probability that is indicative of the messaging entity being a non-reputable messaging entity, the first probably being determined from a product of the first conditional probabilities;
   determining, by the one or more data processors, a second probability that is indicative of the messaging entity being a reputable messaging entity, the second probably being determined from a product of the second conditional probabilities;
   determining, by the one or more data processors, a reputation score from the first and second probabilities, wherein the determined reputation score is indicative of reputation of the messaging entity; and
   wherein the determined reputation score is used in deciding what action is to be taken with respect to a communication associated with the messaging entity.

2. The method of claim 1, wherein the determined reputation score is distributed to one or more computer systems for use in filtering transmissions.

3. The method of claim 1, wherein the determined reputation score is locally distributed to a program for use in filtering transmissions.

4. The method of claim 1, wherein reputation scores include numeric, textual or categorical reputations that are assigned to messaging entities based on characteristics of the messaging entities and their behavior; wherein the numeric reputations fluctuate between a continuous spectrum of reputable and non-reputable classifications.

5. The method of claim 1, wherein a type of messaging entity to which reputations are assigned is a domain name, IP address, phone number, or individual electronic address or username representing an organization, computer, or individual user that transmits electronic messages.

6. The method of claim 1, wherein the reputation of each messaging entity is encoded within the form of a 32-bit, dotted decimal IP address; said method further comprising:
   creating a domain name server (DNS) zone comprising the reputations of all messaging entities in a universe of messaging entities; and
   distributing reputations of messaging entities, via the DNS protocol, to one or more computer systems that make use of the reputations for their work.

7. The method of claim 1, wherein the set of criteria are metrics selected from the group: a mean Spam Profiler score; a reverse domain name server lookup failure; membership on one or more real-time blacklists (RBLs); mail volume; mail burstiness; mail breadth; a geographic location; malware activity; a type of address; a classless inter-domain routing (CIDR) block comprising a number of internet protocol addresses identified to send spam; rate of user complaints; rate of honeypot detections; rate of undeliverable transmissions, identified conformance with laws, regulations, and well-established standards of transmission behavior; continuity of operation; responsiveness to recipient demands; and combinations thereof.

8. The method of claim 1, further comprising encoding the messaging entity reputation within a 32-bit dotted decimal IP address according to a function comprising:

$$IP = 172 \cdot \left(\frac{rep - |rep|}{2 \times rep}\right) \cdot (|rep| div 256) \cdot (|rep| \mod 256).$$

9. The method of claim 1, wherein classifications of reputable and non-reputable are related to a tendency for an IP address to send unwanted transmissions or legitimate communication.

10. A method of performing transmission filtering utilizing reputation scores of transmission senders, the method comprising:
identifying at least one characteristic about a transmission from a sender;
performing a real-time query to a reputation system that includes the transmission characteristic;
receiving a score representing reputation related to the sender of the transmission;
performing an action on the transmission from the sender corresponding to the score range of the sender's reputation;
wherein the reputation score of the sender is encoded within the form of a 32-bit, dotted decimal IP address;
wherein the reputation system comprises a domain name server (DNS) zone comprising the reputations of all messaging entities in a universe of messaging entities; and
wherein the DNS zone distributes reputations of messaging entities, via the DNS protocol, to querying computer systems for filtering messages.

11. The method of claim 10, wherein the action includes at least one of the following actions: rejecting all further transmissions from that sender for a preset period of time or number of transmissions; silently dropping all further transmissions from that sender for a preset period of time or number of transmissions; quarantining all further transmissions from that sender for a preset period of time or number of transmissions; bypassing certain filtering tests for all further transmissions from that sender for a preset period of time or number of transmissions.

12. The method of claim 10, wherein the step of identifying at least one characteristic includes extracting unique identifying information about the transmission, or authenticating unique identifying information about the transmission, or combinations thereof.

13. The method of claim 12, wherein the unique identifying information includes information about the sender of the transmission.

14. An article of manufacture comprising a physical computer readable storage device having instructions encoded thereon, the instructions operable to cause one or more data processing devices to perform operations comprising:
receiving data that identifies one or more characteristics related to a messaging entity's communication;
for each criterion in a set of criteria for use in discriminating between reputable and non-reputable classifications:
determining whether the criterion applies to the messaging entity;
determining a first conditional probability that the messaging entity is a non-reputable messaging entity in response to determining that the criterion applies to the messaging entity; and
determining a second conditional probability that the messaging entity is a reputable messaging entity in response to determining that the criterion applies to the messaging entity;
determining a first probability that is indicative of the messaging entity being a non-reputable messaging entity, the first probably being determined from a product of the first conditional probabilities;
determining a second probability that is indicative of the messaging entity being a reputable messaging entity, the second probably being determined from a product of the second conditional probabilities; and
determining a reputation score from the first and second probabilities, wherein the determined reputation score is indicative of reputation of the messaging entity; and
wherein the determined reputation score is used in deciding what action is to be taken with respect to a communication associated with the messaging entity.

15. A system comprising:
a data processing apparatus; and
software stored on a computer storage apparatus and comprising instructions executable by the data processing apparatus and upon such execution cause the data processing apparatus to perform operations comprising:
receiving data that identifies one or more characteristics related to a messaging entity's communication;
for each criterion in a set of criteria for use in discriminating between reputable and non-reputable classifications:
determining, by one or more data processors, whether the criterion applies to the messaging entity;
determining, by the one or more data processors, a first conditional probability that the messaging entity is a non-reputable messaging entity in response to determining that the criterion applies to the messaging entity; and
determining, by the one or more data processors, a second conditional probability that the messaging entity is a reputable messaging entity in response to determining that the criterion applies to the messaging entity;
determining, by the one or more data processors, a first probability that is indicative of the messaging entity being a non-reputable messaging entity, the first probably being determined from a product of the first conditional probabilities;
determining, by the one or more data processors, a second probability that is indicative of the messaging entity being a reputable messaging entity, the second probably being determined from a product of the second conditional probabilities;
determining, by the one or more data processors, a reputation score from the first and second probabilities, wherein the determined reputation score is indicative of reputation of the messaging entity; and wherein the determined reputation score is used in deciding what action is to be taken with respect to a communication associated with the messaging entity.

16. The system of claim 15, wherein classifications of reputable and non-reputable are related to a tendency for an IP address to send unwanted transmissions or legitimate communication.

17. The system of claim 15, wherein a type of messaging entity to which reputations are assigned is a domain name, IP address, phone number, or individual electronic address or username representing an organization, computer, or individual user that transmits electronic messages.

18. The system of claim 15, wherein reputation scores include numeric, textual or categorical reputations that are assigned to messaging entities based on characteristics of the messaging entities and their behavior; wherein the numeric reputations fluctuate between a continuous spectrum of reputable and non-reputable classifications.

19. The system of claim 15, wherein the determined reputation score is distributed to one or more computer systems for use in filtering transmissions.

20. The system of claim 15, wherein the determined reputation score is locally distributed to a program for use in filtering transmissions.

21. An article of manufacture comprising a physical computer readable storage device having instructions encoded thereon, the instructions operable to cause one or more data processing devices to perform operations comprising:
- identifying at least one characteristic about a transmission from a sender;
- performing a real-time query to a reputation system that includes the transmission characteristic;
- receiving a score representing reputation related to the sender of the transmission;
- performing an action on the transmission from the sender corresponding to the score range of the sender's reputation;
- wherein the reputation score of the sender is encoded within the form of a 32-bit, dotted decimal IP address;
- wherein the reputation system comprises a domain name server (DNS) zone comprising the reputations of all messaging entities in a universe of messaging entities; and
- wherein the DNS zone distributes reputations of messaging entities, via the DNS protocol, to querying computer systems for filtering messages.

\* \* \* \* \*